(12) United States Patent
Takenaka

(10) Patent No.: US 9,357,008 B2
(45) Date of Patent: May 31, 2016

(54) NETWORK SYSTEM, NODE DEVICE GROUP, SENSOR DEVICE GROUP, AND METHOD FOR TRANSMITTING AND RECEIVING SENSOR DATA

(75) Inventor: Hideki Takenaka, Shiga (JP)

(73) Assignee: OMRON Corporation, Kyoto-shi, Kyoto (JP)

( * ) Notice: Subject to any disclaimer, the term of this patent is extended or adjusted under 35 U.S.C. 154(b) by 100 days.

(21) Appl. No.: 14/355,147

(22) PCT Filed: Dec. 9, 2011

(86) PCT No.: PCT/JP2011/078516
§ 371 (c)(1),
(2), (4) Date: Apr. 29, 2014

(87) PCT Pub. No.: WO2013/065203
PCT Pub. Date: May 10, 2013

(65) Prior Publication Data
US 2014/0304544 A1    Oct. 9, 2014

(30) Foreign Application Priority Data
Nov. 4, 2011    (JP) .................................. 2011-242574

(51) Int. Cl.
*G06F 11/00* (2006.01)
*H04L 29/08* (2006.01)
*H04W 4/00* (2009.01)
*G06F 11/20* (2006.01)
*H04W 4/04* (2009.01)
(Continued)

(52) U.S. Cl.
CPC ........ *H04L 67/1097* (2013.01); *G06F 11/2002* (2013.01); *H04W 4/006* (2013.01); *H04L 41/0668* (2013.01); *H04L 67/1095* (2013.01); *H04L 67/12* (2013.01); *H04W 4/04* (2013.01); *H04W 84/22* (2013.01)

(58) Field of Classification Search
USPC ........................................................ 714/4.2
See application file for complete search history.

(56) References Cited

U.S. PATENT DOCUMENTS

| | | | |
|---|---|---|---|
| 2005/0014486 A1 | 1/2005 | Shimizu et al. | |
| 2005/0273645 A1* | 12/2005 | Satran ................ | G06F 11/2033 714/4.1 |
| 2006/0085785 A1* | 4/2006 | Garrett .................. | G06F 9/5061 718/1 |

(Continued)

FOREIGN PATENT DOCUMENTS

| | | |
|---|---|---|
| EP | 1954004 A1 | 8/2008 |
| EP | 2410500 A1 | 1/2012 |

(Continued)

OTHER PUBLICATIONS

Extended European Search Report issued in corresponding European Application No. 11875068.6 dated Jun. 19, 2015 (9 pages).

(Continued)

Primary Examiner — Sarai Butler
(74) Attorney, Agent, or Firm — Osha Liang LLP

(57) ABSTRACT

Each node device has a sensor data saving information list storage section for storing a sensor data saving information list indicates a proper node device for saving each of sensor data among node devices according to an attribute of the sensor data. A sensor data arrangement section transfers each of the sensor data saved in sensor data storage sections of the node devices to the proper node device for saving the sensor data based on the sensor data saving information list.

18 Claims, 13 Drawing Sheets

(51) Int. Cl.
*H04W 84/22* (2009.01)
*H04L 12/24* (2006.01)

(56) References Cited

U.S. PATENT DOCUMENTS

| | | | |
|---|---|---|---|
| 2006/0242285 A1 | 10/2006 | Moriwaki | |
| 2007/0262863 A1 | 11/2007 | Aritsuka et al. | |
| 2011/0046999 A1* | 2/2011 | Nielsen | G06Q 10/063 705/7.39 |
| 2011/0055382 A1* | 3/2011 | Narasimhan | H04L 41/06 709/224 |
| 2012/0002549 A1* | 1/2012 | Dempo | H04L 45/125 370/235 |

FOREIGN PATENT DOCUMENTS

| | | |
|---|---|---|
| JP | 2003-085213 A | 3/2003 |
| JP | 2004-226157 A | 8/2004 |
| JP | 2010206350 A | 9/2010 |
| WO | 2010107105 A1 | 9/2010 |

OTHER PUBLICATIONS

International Search Report issued in PCT/JP2011/078516 mailed on Jan. 31, 2012 (2 pages).

Oshima, K. et al.; "Autonomous Distributed Storage System in Sink Node Less Wireless Sensor Networks"; Transactions of Information Processing Society of Japan, vol. 51, No. 3, Mar. 2010, pp. 835-845 (11 pages).

* cited by examiner

Fig.15A

| SSID | ELECTRIC FIELD STRENGTH |
|---|---|
| Hoge | −80dbm |
| NODE SSID=1 | −70dbm |
| NODE SSID=2 | −60dbm |
| XYZ | −50dbm |

Fig.15B

| SSID | ELECTRIC FIELD STRENGTH |
|---|---|
| NODE SSID=2 | −60dbm |
| NODE SSID=1 | −70dbm |

…

NETWORK SYSTEM, NODE DEVICE GROUP, SENSOR DEVICE GROUP, AND METHOD FOR TRANSMITTING AND RECEIVING SENSOR DATA

CROSS-REFERENCE TO RELATED APPLICATIONS

This is a national stage application based on PCT/JP2011/078516, filed on Dec. 9, 2011, which claims priority to Japanese Patent Application No 2011-242574, filed Nov. 4, 2011. The priority applications are hereby incorporated by reference in their entirety.

BACKGROUND

1. Technical Field

The present invention relates to a network system and a method for transmitting and receiving sensor data, and more particularly to a network system includes a plurality of node devices and sensor devices each connected to corresponding one of the node devices via a wireless communication and a method for transmitting and receiving sensor data.

The present invention also relates to a node device group and a sensor device group included in the network system.

2. Related Art

As an example of this type of network system, there is conventionally known a system in which a data processing server as a computer apparatus is communicatively connected to first to third sensor terminals as a plurality of node devices via a network and each of the sensor terminals is accessible by one or more sensor devices via the wireless communication as described in FIG. 36 of Patent Document 1 (Japanese Patent Laid-open Publication No. 2003-85213).

Patent Document 1: Japanese Patent Laid-open Publication No. 2003-85213

SUMMARY

In the above described network system, each sensor terminal, for example, acquires sensor data from the sensor device connected to the sensor terminal via the wireless communication and saves the sensor data in a sensor data storage section included in the sensor terminal. The above described data processing server requests sensor data from any of the one or more sensor devices by specifying the sensor data and acquires the specified sensor data from the sensor terminal which saved the specified sensor data in the sensor data storage section among the plurality of sensor terminals via the network.

A wireless communication fault in one of the sensor terminals or a change in the surroundings of one of the sensor terminals, for example, may break the connection between the sensor terminal and the sensor device connected to the sensor terminal via the wireless communication. After the disconnection in the above described network system, the sensor terminal with the fault is unable to acquire the sensor data from the sensor device and, as a result, the above described data processing server is unable to collect sensor data from the sensor device.

Accordingly, one or more embodiments of the present invention is a network system in which at least one computer apparatus communicatively connected to a plurality of node devices via a network and each of the node devices is accessible by one or more sensor devices via the wireless communication wherein the network system ensures that the computer apparatus can collect the sensor data from the sensor device reliably.

Additionally, one or more embodiments of the present invention is a node device group and a sensor device group included in the network system and a method for transmitting and receiving the sensor data.

The present invention, according to one or more embodiments, provides a network system wherein at least one computer apparatus and a plurality of node devices are communicatively connected to each other via a network, each of the plurality of node devices is accessible by one or more sensor devices via the wireless communication, each of the sensor devices sequentially tries to connect to one or more candidate node devices for connection among the plurality of node devices via the wireless communication, each of the node devices acquires a sensor data from the sensor device connected to the node device itself via the wireless communication and saves the sensor data in a sensor data storage section included in the node device itself, and the computer apparatus requests the sensor data from any one or more of the one or more sensor devices by specifying the sensor data and acquires the sensor data from any of the plurality of node devices via the network, wherein the network system includes: a sensor data saving information list storage section for storing a sensor data saving information list indicates a proper node device among the plurality of node devices for saving each of the sensor data saved in the sensor data storage sections of the plurality of node devices according to an attribute of the sensor data; and a sensor data arrangement section for transferring each of the sensor data saved in the sensor data storage sections of the plurality of node devices to the proper node device for saving the sensor data based on the sensor data saving information list.

In this description, the term "computer apparatus" widely refers to computers be able to communicate via a network whether they are called a client device, a server device, or a host computer.

The term "network" widely refers to networks such as a local area network (LAN), a wide area network (WAN), or the Internet whether they are wired or wireless.

A node device inaccessible by a sensor device (for example, a dummy node device) may be connected to the network in addition to the plurality of node devices (each of which is accessible by one or more sensor devices via the wireless communication).

The term "sensor device" widely refers to devices with sensing functions whether they form a sensor node or not.

As for the "sensor data saving information list storage section" and the "sensor data arrangement section", it is only required for the network system to be provided with the "sensor data saving information list storage section" and the "sensor data arrangement section" wherever the sections are arranged in the network system.

In the network system according to one or more embodiments the present invention, each of the sensor devices sequentially tries to connect to one or more candidate node devices for connection among the plurality of node devices via the wireless communication and establishes a connection with any one of the node devices. Each of the node devices acquires sensor data from the sensor device connected to the node device via the wireless communication and saves the sensor data in the sensor data storage section included in the node device. The sensor data arrangement section transfers each of the sensor data saved in the sensor data storage sections of the plurality of node devices to the proper node device for saving the sensor data based on the sensor data saving information list. As a result, the respective sensor data are saved in the proper node devices for saving them among the plurality of node devices according to the attributes of the sensor data. Therefore, the network system can not only save the optionally categorized sensor data from the one or more sensor devices but also easily manage the sensor data. The management of the sensor data in this context includes extraction of the sensor data, comparison between the plurality of sensor data, and computation on the basis of the plurality of sensor data.

When the computer apparatus is to collect the sensor data, it requests the sensor data from any one or more of the one or more sensor devices by specifying the sensor data and acquires the specified sensor data from the node devices which saved the specified sensor data in the sensor data storage sections among the plurality of node devices via the network. For example, the computer apparatus specifies the sensor data from any one or more of the one or more sensor devices and requests each of the plurality of node devices for the sensor data via the network. In response to the request issued by the computer apparatus, the node devices which saved the specified sensor data in the sensor data storage sections among the plurality of node devices transmit the specified sensor data to the computer apparatus via the network. As a result, the computer apparatus can acquire the desired sensor data even when the computer does not know which of the plurality of node devices save the desired sensor data.

A wireless communication fault in one of the node devices or a change in the surroundings of one of the node devices, for example, may break the connection between the node device and the sensor device connected to the node device via the wireless communication. Even in the case of such disconnection, the network system according to one or more embodiments of the present invention has the sensor device try to connect to another candidate node device for connection to establish a connection with the candidate node device. Once the node device has established a new connection with the sensor device, the node device can acquire the sensor data from the sensor device. The sensor data from the sensor device is saved in the proper node device for saving the sensor data among the plurality of node devices according to the attribute of the sensor data by the aforementioned sensor data arrangement section. Therefore, even after a wireless communication fault or the like in one of the node devices has broken the connection between the node device and the sensor device, the computer apparatus can collect the sensor data from the sensor devices reliably.

In the network system according to an embodiment, the attribute of the sensor data is information for identifying the sensor device that acquired the sensor data.

In the network system according to the embodiment, the respective sensor data are saved in the sensor data storage sections of the proper node devices for saving the sensor data according to the information for identifying the sensor devices that acquired the sensor data. Therefore, the network system can categorize the sensor data according to the sensor devices that acquired the sensor data and save the sensor data in the appropriate node devices to facilitate management of the sensor data.

In the network system according to an embodiment, the attribute of the sensor data is information for identifying the type of the sensor data.

In the network system according to the embodiment, the respective sensor data are saved in the sensor data storage sections of the proper node devices for saving the sensor data according to the information for identifying the types of the sensor data. Therefore, the network system can categorize the sensor data according to the types of the sensor data and save the sensor data in the appropriate node devices to facilitate management of the sensor data.

In the network system according to an embodiment, the sensor data saving information list indicates that the sensor data of the same contents are to be saved in at least two of the plurality of node devices respectively.

In the network system according to the embodiment, the sensor data saving information list indicates that the sensor data of the same contents is to be saved in at least two of the plurality of node devices. Therefore, the network system can save the sensor data in at least the two node devices to achieve redundancy of the sensor data.

In the network system according to an embodiment, each of the node devices generates a connection rejection signal for rejecting a connection between the node device itself and the sensor device when a load on the node device itself is greater than a threshold value, and each of the sensor devices includes: a signal detection section for detecting the connection rejection signal generated by the node device itself from the node device connected to the sensor device itself via the wireless communication; and a first wireless connection switching section for stopping connecting to the node device currently connected to the sensor device itself and sequentially trying to connect to the candidate node device for connection other than the node device currently connected to the sensor device itself when the signal detection section detected the connection rejection signal.

The term "load" on the node device in this description widely refers to the utilization rate of a CPU (central processing unit) in the node device, the number and the amount of the sensor data managed by the node device, the number of times that the node device returns the sensor data to the computer apparatus within the above described time period, the number of times that the node device processes the sensor data within the above described time period, and the like.

In the network system according to the embodiment, each of the node devices generates a connection rejection signal for rejecting a connection between the node device itself and the sensor device when a load on the node device itself is greater than a threshold value. The signal detection section of each of the sensor devices detects the connection rejection signal generated by the node device itself from the node device connected to the sensor device itself via the wireless communication. When the signal detection section detected the connection rejection signal, the first wireless connection switching section stops connecting to the node device currently connected to the sensor device itself, sequentially tries to connect to the candidate node device for connection other than the node device currently connected to the sensor device itself and establish the connection. As a result, even when the connection rejection signal was detected, the node device connected to the sensor device by the first wireless connection switching section as a successor to the node device previously connected to the sensor device can automatically acquire the sensor data from the sensor device. Therefore, the node device connected to the sensor device can acquire the sensor data from the sensor device reliably. Besides, the embodiment can prevent overload of each node device caused by the load on each node device exceeding the threshold value. Consequently, the configuration can improve the performance of the whole network system. For example, the embodiment can avoid a situation in which any of the plurality of node devices has a trouble in responding to the computer apparatus with the sensor data. Also, the network system can always keep good performance even when the condition of the radio wave for the wireless communication, the network traffic, and the number of sensor data collected by each sensor device change every moment.

In the network system according to an embodiment, each of the sensor devices comprises: a fault detection section for detecting a fault in the node device connected to the sensor device itself via the wireless communication; and a second wireless connection switching section for stopping connecting to the node device currently connected to the sensor device itself and sequentially trying to connect to the candidate node devices for connection other than the node device currently connected to the sensor device itself when the fault detection section detected the fault.

In the network system according to the embodiment, the fault detection section of each of the sensor devices detects a wireless communication fault in the node device connected to the sensor device via the wireless communication. When the fault detection section detected the fault, the second wireless connection switching section stops connecting to the node device currently connected to the sensor device itself, sequentially trying to connect to the candidate node devices for connection other than the node device currently connected to the sensor device and establish the connection. As a result, even when the wireless communication fault was detected, the node device connected to the sensor device by the second wireless connection switching section as a successor to the node device previously connected to the sensor device can automatically acquire the sensor data from the sensor device. Therefore, the embodiment can realize fault-tolerance (being tolerant to a fault, i.e., capability of minimizing damage caused by a wireless communication fault).

In the network system according to an embodiment, each of the sensor devices has an electric field strength detection section for detecting a node device available for the sensor device itself to connect to via the wireless communication and detecting an electric field strength of the node device, and each of the sensor devices sequentially tries to connect to the node devices in descending order of the electric field strength.

In the network system according to the embodiment, the electric field strength detection section of each of the sensor devices detects the node device available for the sensor device to connect to via the wireless communication and also detects the electric field strength of the node device. Then, each of the sensor devices sequentially tries to connect to the node devices in descending order of the electric field strength. Therefore, for example, when one of the sensor devices is to be newly connected to one of the node devices via the wireless communication, the sensor device can sequentially try to connect to the node devices available for the sensor device to connect to in descending order of the electric field strength. Therefore, the node device connected to the sensor device can acquire the sensor data from the sensor device reliably.

In the network system according to an embodiment, each of the sensor devices has a connection target list storage section for storing a connection target list that indicates the candidate node devices for connection, and each of the sensor devices sequentially tries to connect to one or more of the candidate node devices indicated in the connection target list.

In the network system according to the embodiment, each of the sensor devices has the connection target list storage section for storing the connection target list that indicates the candidate node devices for connection, and each of the sensor devices sequentially tries to connect to one or more of the candidate node devices indicated in the connection target list. Therefore, each of the sensor devices can promptly connect to an appropriate one of the node devices based on the connection target list instead of recklessly repeating retry of transmission to the node device.

In the network system according to an embodiment, the connection target list is a predetermined list.

In the network system according to the embodiment, the connection target list is a predetermined list. Therefore, each of the sensor devices can more promptly connect to an appropriate one of the node devices based on the connection target list.

In the network system according to an embodiment, the sensor data saving information list storage section is provided for each of the plurality of node devices respectively and contents of the sensor data saving information lists in the plurality of node devices are synchronized with each other.

In this description, the expression as contents of the sensor data saving information lists "are synchronized" with each other means that the network system processes the same list of stored in two or more places so as to have the same contents. As soon as a file stored in a certain place is changed, the same file stored in another place is also changed by synchronous processing.

In the network system of the embodiment, the sensor data saving information list storage section is provided for each of the plurality of node devices and contents of the sensor data saving information lists of the plurality of node devices are synchronized with each other. Therefore, each of the node devices can promptly recognize a proper node device for saving each of the sensor data saved in the sensor data storage sections among the plurality of node devices according to the attribute of the sensor data by referring to the contents of the sensor data saving information list storage section provided for the node device. Also, each of the node devices can promptly transfer each of the sensor data saved in the sensor data storage sections of the plurality of node devices to the proper node device for saving the sensor data by the sensor data arrangement section of itself based on the sensor data saving information list.

There is provided a node device group according to one or more embodiments of the present invention comprising a plurality of node devices in a network system wherein at least one computer apparatus and the plurality of node devices are communicatively connected to each other via a network, each of the plurality of node devices is accessible by one or more sensor devices via the wireless communication, each of the sensor devices sequentially tries to connect to one or more candidate node devices for connection among the plurality of node devices via the wireless communication, each of the node devices acquires a sensor data from the sensor device connected to the node device itself via the wireless communication and saves the sensor data in a sensor data storage section included in the node device itself, and the computer apparatus requests the sensor data from any one or more of the one or more sensor devices by specifying the sensor data and acquires the sensor data from any of the plurality of node devices via the network, wherein the node device group includes: a sensor data saving information list storage section for storing a sensor data saving information list indicates a proper node device among the plurality of node devices for saving each of the sensor data saved in the sensor data storage sections of the plurality of node devices according to an attribute of the sensor data; and a sensor data arrangement section for transferring each of the sensor data saved in the sensor data storage sections of the plurality of node devices to the proper node device for saving the sensor data based on the sensor data saving information list.

In the network system provided with the node device group according to one or more embodiments of the present invention, each of the sensor devices sequentially tries to connect to one or more candidate node devices for connection among the plurality of node devices via the wireless communication to establish a connection with any one of the node devices. Each of the node devices acquires the sensor data from the sensor device connected to the node device via the wireless communication and saves the sensor data in the sensor data storage section included in the node device. The sensor data arrangement section transfers each of the sensor data saved in the sensor data storage sections of the plurality of node devices to the proper node device for saving the sensor data based on the sensor data saving information list. As a result, the respective sensor data are saved in the proper node devices for saving them among the plurality of node devices according to the attributes of the sensor data. Therefore, the network system can not only save the optionally categorized sensor data from the one or more sensor devices but also easily manage the sensor data. The management of the sensor data in this context includes extraction of the sensor data, comparison between the plurality of sensor data, and computation on the basis of the plurality of sensor data.

When the computer apparatus is to collect the sensor data, it requests the sensor data from any one or more of the one or more sensor devices by specifying the sensor data and acquires the specified sensor data from the node devices which saved the specified sensor data in the sensor data storage sections among the plurality of node devices via the network. For example, the computer apparatus specifies the sensor data from any one or more of the one or more sensor devices and requests each of the plurality of node devices for the sensor data via the network. In response to the request issued by the computer apparatus, the node devices which saved the specified sensor data in the sensor data storage sections among the plurality of node devices transmit the specified sensor data to the computer apparatus via the network. As a result, the computer apparatus can acquire the desired sensor data even when it does not know which of the plurality of node devices save the desired sensor data.

A wireless communication fault in one of the node devices or a change in the surroundings of one of the node devices, for example, may break the connection between the node device and a sensor device connected to the node device via the wireless communication. Even in the case of such disconnection, the network system according to one or more embodiments of the present invention has the sensor device try to connect to another candidate node device for connection to establish a connection with the candidate node device. Once the node device has established a new connection with the sensor device, the node device can acquire the sensor data from the sensor device. The sensor data from the sensor device is saved in the proper node device for saving the sensor data among the plurality of node devices according to the attribute of the sensor data by the aforementioned sensor data arrangement section. Therefore, even after a wireless communication fault or the like in one of the node devices has broken the connection between the node device and the sensor device, the computer apparatus can collect the sensor data from the sensor devices reliably.

There is provided a sensor device group comprising one or more sensor devices in a network system wherein at least one computer apparatus and a plurality of node devices are communicatively connected to each other via a network, each of the plurality of node devices is accessible by one or more of the sensor devices via the wireless communication, each of the node devices acquires a sensor data from the sensor device connected to the node device itself via the wireless communication and saves the sensor data in a sensor data storage section included in the node device itself, and the computer apparatus requests the sensor data from any one or more of the one or more sensor devices by specifying the sensor data and acquires the sensor data from any of the plurality of node devices via the network, wherein the network system includes: a sensor data saving information list storage section for storing a sensor data saving information list indicates a proper node device among the plurality of node devices for saving each of the sensor data saved in the sensor data storage sections of the plurality of node devices according to an attribute of the sensor data; and a sensor data arrangement section for transferring each of the sensor data saved in the sensor data storage sections of the plurality of node devices to the proper node device for saving the sensor data based on the sensor data saving information list, and each of the sensor devices sequentially tries to connect to one or more candidate node devices for connection among the plurality of node devices via the wireless communication.

In the network system provided with the sensor device group according to one or more embodiments of the present invention, each of the sensor devices sequentially tries to connect to one or more candidate node devices for connection among the plurality of node devices via the wireless communication and establishes a connection with any one of the node devices. Each of the node devices acquires sensor data from the sensor device connected to the node device via the wireless communication and saves the sensor data in the sensor data storage section included in the node device. The sensor data arrangement section transfers each of the sensor data saved in the sensor data storage sections of the plurality of node devices to the proper node device for saving the sensor data based on the sensor data saving information list. As a result, the respective sensor data are saved in the proper node devices for saving them among the plurality of node devices according to the attributes of the sensor data. Therefore, the network system can not only save the optionally categorized sensor data from the one or more sensor devices but also easily manage the sensor data. The management of the sensor data in this context includes extraction of the sensor data, comparison between the plurality of sensor data, and computation on the basis of the plurality of sensor data.

When the computer apparatus is to collect the sensor data, it requests the sensor data from any one or more of the one or more sensor devices by specifying the sensor data and acquires the specified sensor data from the node devices which saved the specified sensor data in the sensor data storage sections among the plurality of node devices via the network. For example, the computer apparatus specifies the sensor data from any one or more of the one or more sensor devices and requests each of the plurality of node devices for the sensor data via the network. In response to the request issued by the computer apparatus, the node devices which saved the specified sensor data in the sensor data storage sections among the plurality of node devices transmit the specified sensor data to the computer apparatus via the network. As a result, the computer apparatus can acquire the desired sensor data even when it does not know which of the plurality of node devices save the desired sensor data.

A wireless communication fault in one of the node devices or a change in the surroundings of one of the node devices, for example, may break the connection between the node device and a sensor device connected to the node device via the wireless communication. Even in the case of such disconnection, the network system according to one or more embodiments of the present invention has the sensor device try to connect to another candidate node device for connection to establish a connection with the candidate node device. Once the node device has established a new connection with the sensor device, the node device can acquire the sensor data from the sensor device. The sensor data from the sensor device is saved in the proper node device for saving the sensor data among the plurality of node devices according to the attribute of the sensor data by the aforementioned sensor data arrangement section. Therefore, even after a wireless communication fault or the like in one of the node devices has broken the connection between the node device and the sensor device, the computer apparatus can collect the sensor data from the sensor devices reliably.

In the sensor device group according to an embodiment, each of the node devices generates a connection rejection signal for rejecting a connection between the node device itself and the sensor device when a load on the node device itself is greater than a threshold value, and each of the sensor devices comprises: a signal detection section for detecting the connection rejection signal generated by the node device itself from the node device connected to the sensor device itself via the wireless communication; and a first wireless connection switching section for stopping connecting to the node device currently connected to the sensor device itself and sequentially trying to connect to the candidate node device for connection other than the node device currently connected to the sensor device itself when the signal detection section detected the connection rejection signal.

In the sensor device group according to an embodiment, each of the sensor devices comprises: a fault detection section for detecting a fault in the node device is connected to the sensor device via the wireless communication; and a second wireless connection switching section for stopping connecting to the node device currently connected to the sensor device itself and sequentially trying to connect to the candidate node devices for connection other than the node device currently connected to the sensor device itself when the fault detection section detected the fault.

In the sensor device group according to an embodiment, each of the sensor devices comprises an electric field strength detection section for detecting a node device available for the sensor device itself to connect to via the wireless communication and detecting an electric field strength of the node device, and each of the sensor devices sequentially tries to connect to the node devices in descending order of the electric field strength.

In the sensor device group according to an embodiment, each of the sensor devices includes a connection target list storage section for storing a connection target list that indicates the candidate node devices for connection, and each of the sensor devices sequentially tries to connect to one or more of the candidate node devices indicated in the connection target list.

There is provided a method for transmitting and receiving sensor data in a network system wherein at least one computer apparatus and a plurality of node devices are communicatively connected to each other via a network, each of the plurality of node devices is accessible by one or more sensor devices via the wireless communication, each of the sensor devices sequentially tries to connect to one or more candidate node devices for connection among the plurality of node devices via the wireless communication, each of the node devices acquires a sensor data from the sensor device connected to the node device itself via the wireless communication and saves the sensor data in a sensor data storage section included in the node device itself, and the computer apparatus requests the sensor data from any one or more of the one or more sensor devices by specifying the sensor data and acquires the sensor data from any of the plurality of node devices via the network, wherein the method for transmitting and receiving sensor data comprises steps of: causing a sensor data saving information list storage section to store a sensor data saving information list indicates a proper node device among the plurality of node devices for saving each of the sensor data saved in the sensor data storage sections of the plurality of node devices according to an attribute of the sensor data; and causing a sensor data arrangement section to transfer each of the sensor data saved in the sensor data storage sections of the plurality of node devices to the proper node device for saving the sensor data based on the sensor data saving information list.

In the method for transmitting and receiving sensor data according to one or more embodiments of the present invention, each of the sensor devices sequentially tries to connect to one or more candidate node devices for connection among the plurality of node devices via the wireless communication and establishes a connection with any one of the node devices. Each of the node devices acquires the sensor data from the sensor device connected to the node device via the wireless communication and saves the sensor data in the sensor data storage section included in the node device. The sensor data arrangement section transfers each of the sensor data saved in the sensor data storage sections of the plurality of node devices to the proper node device for saving the sensor data based on the sensor data saving information list. As a result, the respective sensor data are saved in the proper node devices for saving them among the plurality of node devices according to the attributes of the sensor data. Therefore, the network system can not only save the optionally categorized sensor data from the one or more sensor devices but also easily manage the sensor data. The management of the sensor data in this context includes extraction of the sensor data, comparison between the plurality of sensor data, and computation on the basis of the plurality of sensor data.

When the computer apparatus is to collect the sensor data, it requests the sensor data from any one or more of the one or more sensor devices by specifying the sensor data and acquires the specified sensor data from the node devices which saved the specified sensor data in the sensor data storage sections among the plurality of node devices via the network. For example, the computer apparatus specifies the sensor data from any one or more of the one or more sensor devices and requests each of the plurality of node devices for the sensor data via the network. In response to the request issued by the computer apparatus, the node devices which saved the specified sensor data in the sensor data storage sections among the plurality of node devices transmit the specified sensor data to the computer apparatus via the network. As a result, the computer apparatus can acquire the desired sensor data even when it does not know which of the plurality of node devices save the desired sensor data.

A wireless communication fault in one of the node devices or a change in the surroundings of one of the node devices, for example, may break the connection between the node device and a sensor device connected to the node device via the wireless communication. Even in the case of such disconnection, the method for transmitting and receiving sensor data according to one or more embodiments of the present invention has the sensor device try to connect to another candidate node device for connection to establish a connection with the candidate node device. Once the node device has established a new connection with the sensor device, the node device can acquire the sensor data from the sensor device. The sensor data from the sensor device is saved in the proper node device for saving the sensor data among the plurality of node devices according to the attribute of the sensor data by the aforementioned sensor data arrangement section. Therefore, even after a wireless communication fault or the like in one of the node devices has broken the connection between the node device and the sensor device, the computer apparatus can collect the sensor data from the sensor device reliably.

According to the network system, the node device group, the sensor device group, and a method for transmitting and receiving the sensor data of the present invention, a network system ensures that the computer apparatus can collect the sensor data from the sensor device reliably can be realized.

BRIEF DESCRIPTION OF THE DRAWINGS

FIG. 15A is a table showing electric field strengths in devices in the vicinity of the sensor device detected by the electric field strength detection section of the sensor device according to one or more embodiments of the present invention.

FIG. 15B is a table showing electric field strengths in node devices in the vicinity of the sensor device detected by the electric field strength detection section of the sensor device according to one or more embodiments of the present invention.

DETAILED DESCRIPTION

Figure 1:
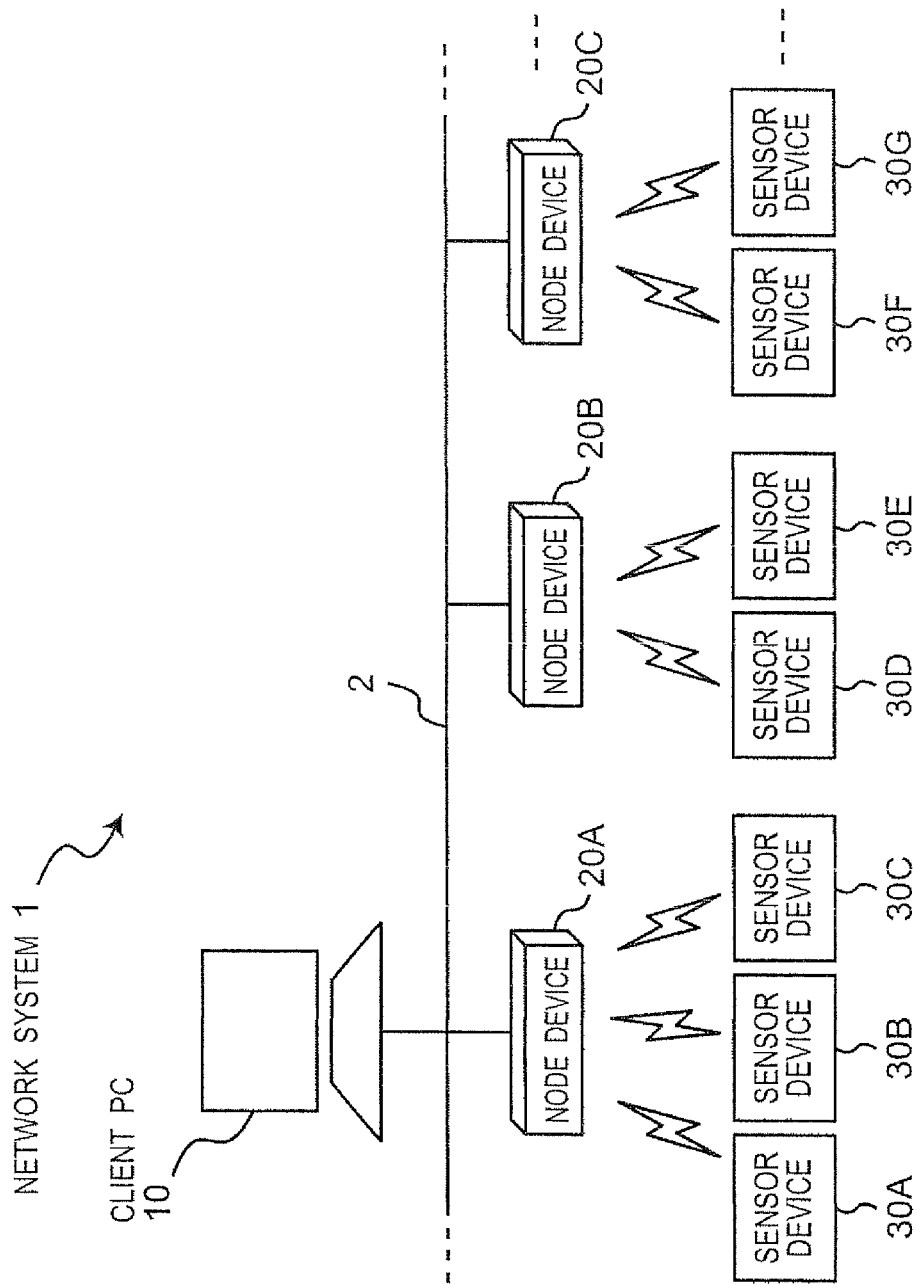
FIG. 1 is a diagram illustrating a schematic configuration of a network system according to one or more embodiments of the present invention.

The present invention will be described in detail by embodiments illustrated in the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. Further, the structures according to the embodiments which will be described later are merely illustrative, and the present invention is not intended to be restricted to the structures according to these embodiments.

FIG. 1 is a diagram illustrating a schematic configuration of a network system (the entire system is denoted by a reference symbol 1) according to an embodiment of the present invention.

The network system 1 includes a client PC (personal computer) 10 as a computer apparatus and a plurality of node devices 20A, 20B, 20C, . . . as a node device group. The client PC 10 and the node devices 20A, 20B, 20C, . . . are communicatively connected to each other via a LAN (local area network) 2 as a network. Each of the plurality of node devices 20A, 20B, 20C, . . . is accessible by one or more sensor devices 30A, 30B, 30C, 30D, 30E, 30F, 30G, . . . via the wireless communication (in this example, Wi-Fi (registered trademark) as a wireless LAN).

Figure 2:
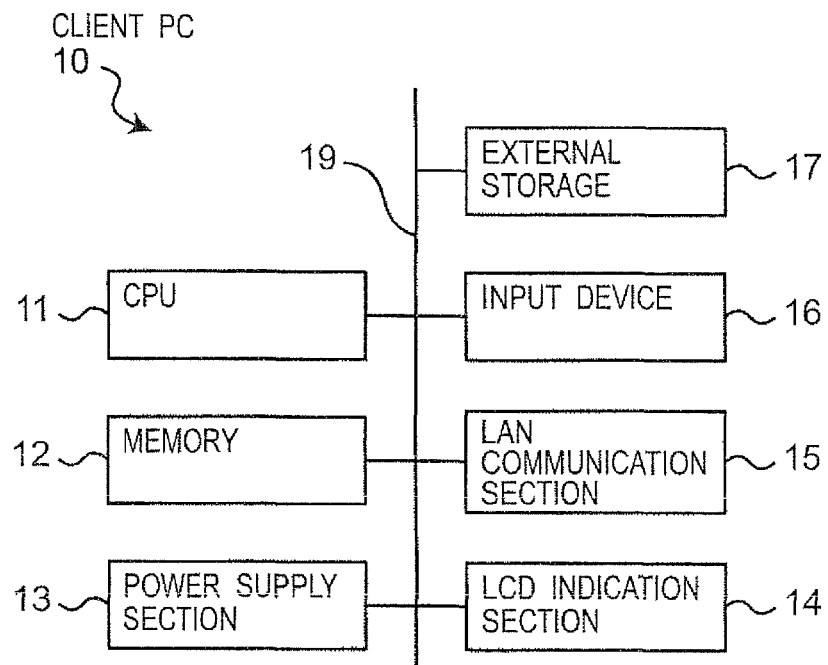
FIG. 2 is a diagram illustrating a block configuration of a client PC (personal computer) included in the network system according to one or more embodiments of the present invention.

As illustrated in a block configuration of FIG. 2, the client PC 10 includes a CPU (central processing unit) 11, a memory 12, a power supply section 13, an LCD (liquid crystal display element) indication section 14 as a display section, a LAN communication section 15, an input device 16 as an input section, and an external storage 17. These constituent elements 11, 12, 13, 14, 15, 16, and 17 are communicatively connected to each other via wiring 19. The CPU 11 controls the operation of the entire client PC 10. The memory 12 includes a DRAM (dynamic random access memory) and stores various types of data. The power supply section 13 supplies the power to the respective constituent elements 11, 12, 13, 14, 15, 16, and 17 at a constant voltage (5 V, 12 V, or the like). The LCD indication section 14 displays respective images according to the control by the CPU 11. The LAN communication section 15 functions to allow the client PC 10 to communicate with the node devices 20A, 20B, 20C, . . . , and other (not shown) computer apparatuses, terminal devices, and the like via the LAN 2. The input device 16 includes a keyboard and a mouse and functions to allow a user to input various types of information and instructions to the client PC 10. The external storage 17 includes a hard disk drive and an optical disk and stores an operating system (OS) and application software (program) for the client PC 10.

Figure 3:
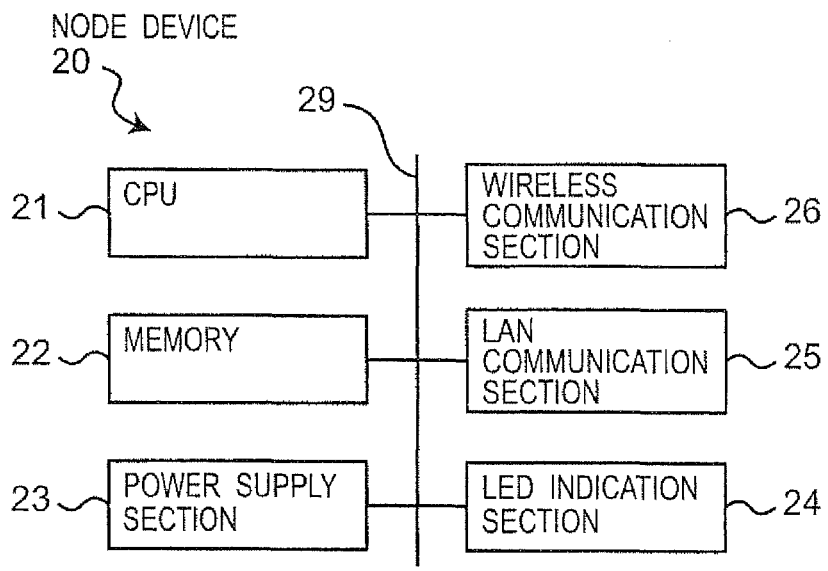
FIG. 3 is a diagram illustrating a block configuration of a node device included in the network system according to one or more embodiments of the present invention.

As illustrated in a block configuration of FIG. 3, each of the node devices 20 (denoted by a common reference symbol 20 for representing the node devices 20A, 20B, 20C, . . . ) includes a CPU 21, a memory 22, a power supply section 23, an LED (light-emitting diode) indication section 24, a LAN communication section 25 as an information transmission section, and a wireless communication section 26. These constituent elements 21, 22, 23, 24, 25, and 26 are communicatively connected to each other via wiring 29. In this example, the CPU 21 operates at a clock frequency of 1.1 GHz and controls the operation of the entire node device 20. In this example, the memory 22 includes a flash memory and a DRAM (with a storage capacity of 512 MB) and stores an OS (in this example, Linux (registered trademark)), a program, and various types of data for the node device 20. The power supply section 23 supplies the power to the respective constituent elements 21, 22, 23, 24, 25, and 26 at a constant voltage (in this example, 5 V). While the power is supplied by the power supply section 23 to the constituent elements, the LED indication section 24 lights the LED (not shown) to indicate that the node device 20 is active. The LAN communication section 25 functions to allow the node device 20 to communicate with the client PC 10, the other node devices, and other (not shown) computer apparatuses, terminal devices, and the like via the LAN 2. The wireless communication section 26 functions to allow the node device 20 to communicate with the sensor devices 30A, 30B, 30C, . . . via the wireless LAN. In this example, a maximum of 64 sensor devices can connect to each of the node devices 20 via the wireless LAN.

Figure 5:
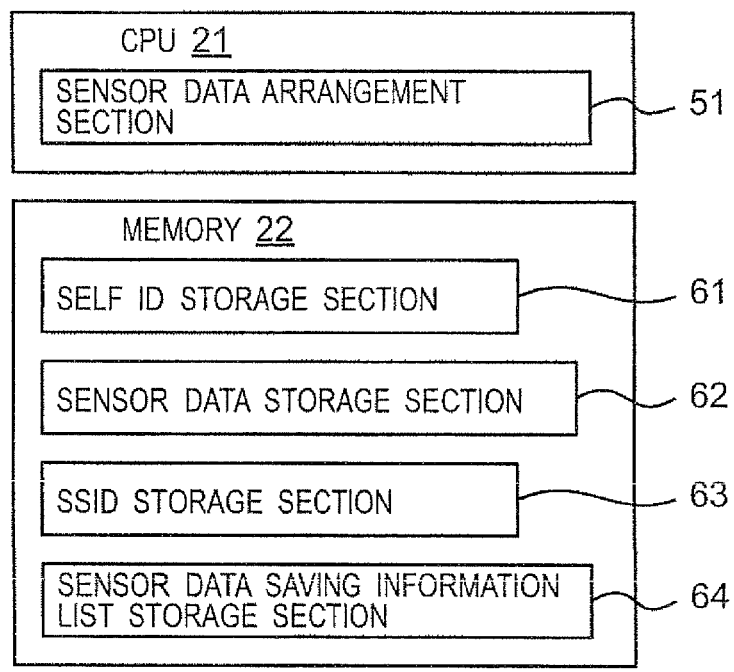
FIG. 5 is a diagram illustrating constituent elements from the viewpoint of functionality of a CPU (central processing unit) and a memory included in the node device according to one or more embodiments of the present invention.

As illustrated in FIG. 5, the memory 22 of each of the node devices 20 has not only a self-ID storage section 61 stores a predetermined identification number (ID) for identifying the node device 20 but also an SSID storage section 63 stores a predetermined service set identifier (SSID) for identifying the connection targets for the wireless LAN connection. The sensor data storage section 62 stores a sensor data from the sensor device connected to the node device 20 via the wireless LAN.

Figure 4:
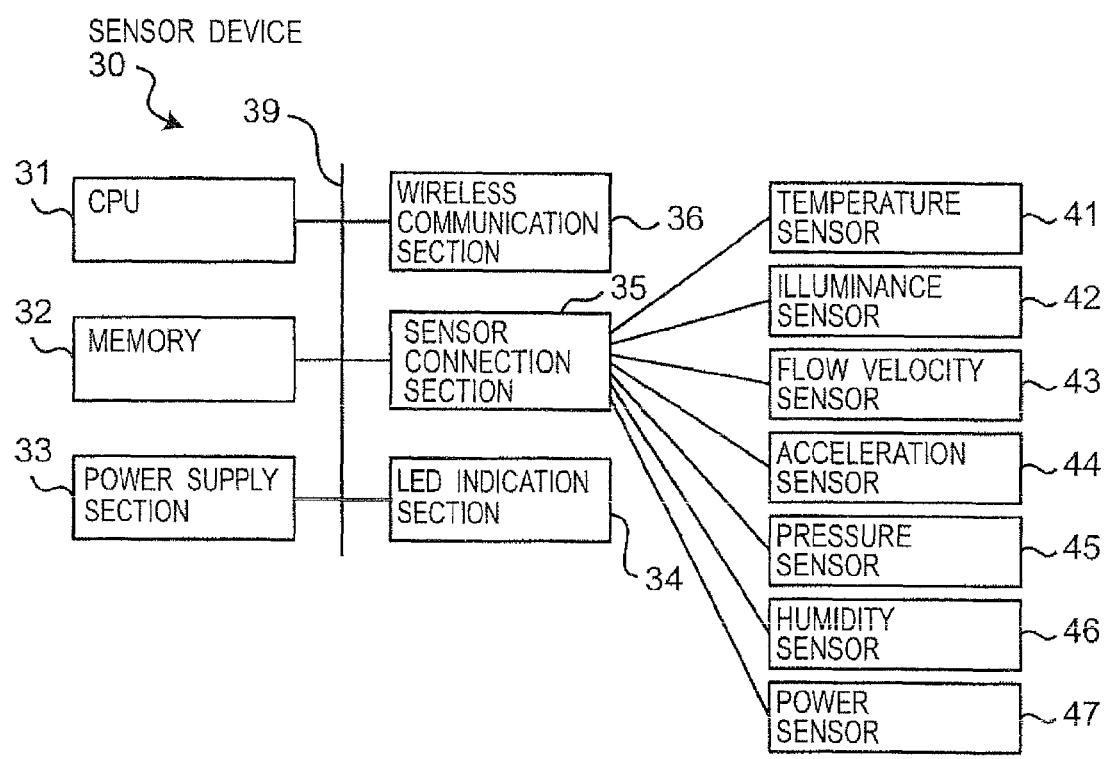
FIG. 4 is a diagram illustrating a block configuration of a sensor device included in the network system according to one or more embodiments of the present invention.

As illustrated in a block configuration of FIG. 4, each of the sensor devices 30 (denoted by a common reference symbol 30 for representing the sensor devices 30A, 30B, 30C, . . . ) includes a CPU 31, a memory 32, a power supply section 33, an LED indication section 34, a sensor connection section 35, and a wireless communication section 36. These constituent elements 31, 32, 33, 34, 35, and 36 are communicatively connected to each other via wiring 39. According to the purpose of the sensor device 30, one or some or all of a temperature sensor 41, an illuminance sensor 42, a flow velocity sensor 43, an acceleration sensor 44, a pressure sensor 45, a humidity sensor 46, and a power sensor 47 are connected to the sensor connection section 35. The sensors 41, 42, 43, 44, 45, 46, and 47 may be contained in a casing of the sensor device 30 or attached to the outside of the casing of the sensor device 30. The CPU 31 controls the operation of the entire sensor device 30. In this example, the memory 32 includes a flash memory and a DRAM and stores a program and various types of data for the sensor device 30. The power supply section 33 supplies the power to the respective constituent elements 31, 32, 34, 35, and 36 and the sensors 41, 42, 43, 44, 45, 46, and 47 at a constant voltage (in this example, 3 V). The LED indication section 34 includes a plurality of LEDs (not shown) and lights or flashes the respective LEDs according to the control by the CPU 31. As a result, the LED indication section 34 indicates the respective states such as whether the power supply of the sensor device 30 is on or off and whether the sensor device 30 is in wireless communication with any of the node devices 20A, 20B, 20C, . . . . The sensor connection section 35 functions to capture a sensor data from the sensor connected to the sensor connection section 35 among the temperature sensor 41, the illuminance sensor 42, the flow velocity sensor 43, the acceleration sensor 44, the pressure sensor 45, the humidity sensor 46, and the power sensor 47 into the sensor device 30 includes the sensor connection section 35. As a result, the sensor device 30 autonomously acquires the sensor data without receiving any particular instruction from outside. The wireless communication section 36 functions to allow the sensor device 30 includes the wireless communication section 36 to communicate with any of the node devices 20A, 20B, 20C, . . . via the wireless LAN.

Figure 6:
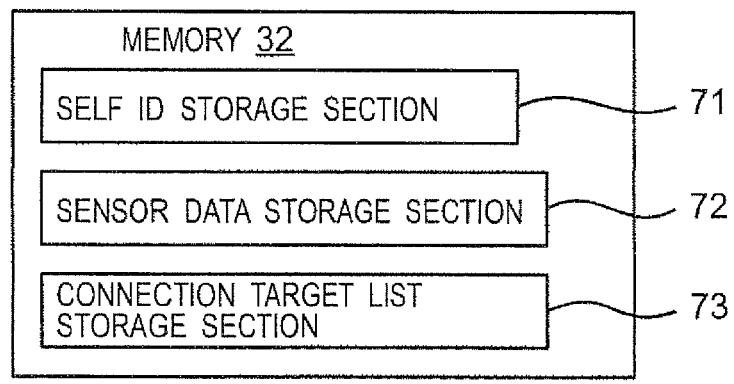
FIG. 6 is a diagram illustrating constituent elements from the viewpoint of functionality of a memory included in the sensor device according to one or more embodiments of the present invention.

As illustrated in FIG. 6, the memory 32 of each of the sensor devices 30 has a self-ID storage section 71 stores an identification number (ID) for identifying the sensor device 30 includes the memory 32 for the wireless LAN connection. A sensor data storage section 72 stores the sensor data has been captured into the sensor device 30 includes the sensor data storage section 72. A connection target list storage section 73 stores a connection target list indicates identification numbers (IDs) of node devices (predetermined several node devices of the node devices 20A, 20B, 20C, . . . ) to be connected to the sensor device 30 includes the connection target list storage section 73 via the wireless communication.

In the example of FIG. 1, the three sensor devices 30A, 30B, and 30C are connected to the node device 20A via the wireless LAN but are not connected to the other node devices 20B, 20C, . . . . The two sensor devices 30D and 30E are connected to the node device 20B via the wireless LAN but are not connected to the other node devices 20A, 20C, . . . . The two sensor devices 30F and 30G are connected to the node device 20C via the wireless LAN but are not connected to the other node devices 20A, 20B, . . . .

According to such a connection configuration, the node device 20A acquires the sensor data from the sensor devices 30A, 30B, and 30C are connected to the node device 20A via the wireless LAN and saves the sensor data in (the sensor data storage section 62 of) the memory 22 included in the node device 20A. The node device 20B acquires the sensor data from the sensor devices 30D and 30E connected to the node device 20B via the wireless LAN and saves the sensor data in the memory 22 included in the node device 20B. Also, the node device 20C acquires the sensor data from the sensor devices 30F and 30G connected to the node device 20C via the wireless LAN and saves the sensor data in the memory 22 included in the node device 20C. Each of the node devices 20A, 20B, 20C, . . . never receives the sensor data from the sensor device not to be connected to itself.

The client PC 10 specifies the sensor data from any one or more of the one or more sensor devices 30A, 30B, 30C, . . . and performs information acquisition request via the LAN 2.

As described above, in the conventional network system, a wireless communication fault in one of the node devices or a change in the surroundings of one of the node devices, for example, may break the connection between the node device and the sensor device connected to the node device via the wireless communication. After the disconnection, in the above described conventional network system, the node device in question is unable to acquire the sensor data from the sensor device and, as a result, the client PC 10 is unable to collect the sensor data from the sensor device.

In the present network system 1, from the viewpoint of functionality, the CPU 21 of each of the node devices 20 has a sensor data arrangement section 51 as illustrated in FIG. 5 (Each of the sensor data arrangement section 51 is implemented as a software program.). The memory 22 of each of the node devices 20 has a sensor data saving information list storage section 64 in addition to the self-ID storage section 61, the sensor data storage section 62, and the SSID storage section 63 described above.

The sensor data saving information list storage section 64 of each of the node devices 20 stores a sensor data saving information list 101 indicates a proper node device among the node devices 20A, 20B, 20C, . . . for saving each of the sensor data saved in the sensor data storage section 62 of each of the node devices 20A, 20B, 20C, according to the attribute of the sensor data. In this example, the sensor data saving information list 101 is initialized via a network 2 by a user input through the input device 16 of the client PC 10. The sensor data saving information lists saved in the sensor data saving information list storage sections 64 of the plurality of the node devices 20A, 20B, 20C, . . . are synchronized with each other. That is, as soon as the sensor data saving information list saved in, for example, the node device 20A is changed, the sensor data saving information lists saved in the other node devices 20B, 20C, . . . are also changed to have the same contents as those of the sensor data saving information list of the node device 20A. When the node devices 20 are switched on and start to operate, the sensor data arrangement sections 51 immediately transfer each of the sensor data saved in the sensor data storage sections 62 of the plurality of node devices 20A, 20B, 20C, . . . to the proper node devices 20 for saving the sensor data based on the sensor data saving information list 101. Then, the LAN communication sections 25 (see FIG. 3) transmit the sensor data transferred by the sensor data arrangement sections 51 to the client PC 10. Further, the LAN communication sections 25 transmit the originally saved sensor data to the client PC 10.

Now, the operation of the sensor data arrangement sections 51 of the node devices 20 in transferring the sensor data to the proper node devices 20A and 20B for saving the sensor data based on the attributes of the sensor data will be described with reference to FIGS. 7 and 8 (The reference symbols in FIGS. 5 and 6 will be used as required.).

Figure 7:
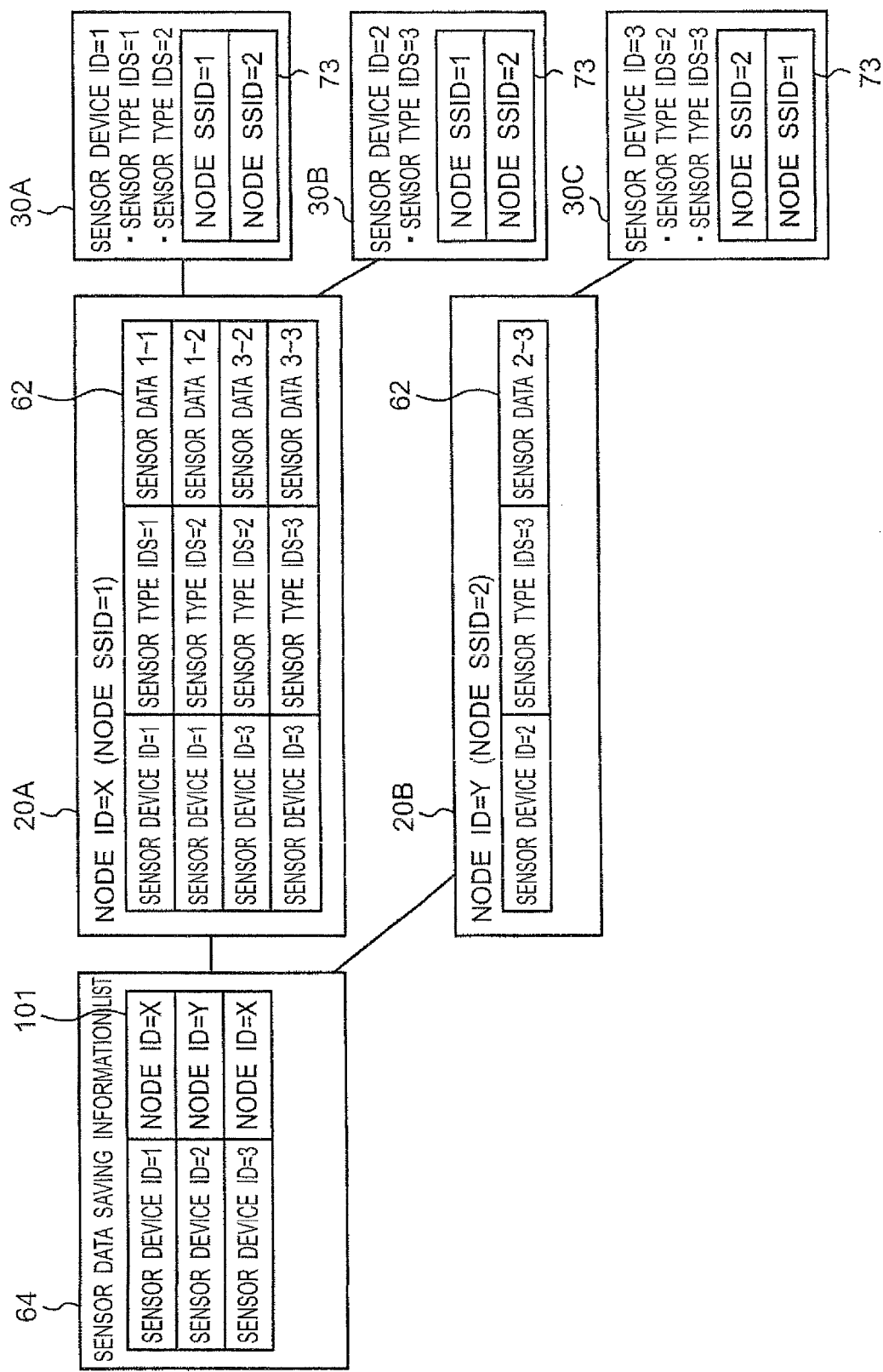
FIG. 7 is a diagram describing sensor data having been transferred to proper node devices for saving the sensor data based on information for identifying sensor devices that acquired the sensor data according to one or more embodiments of the present invention.
Figure 8:
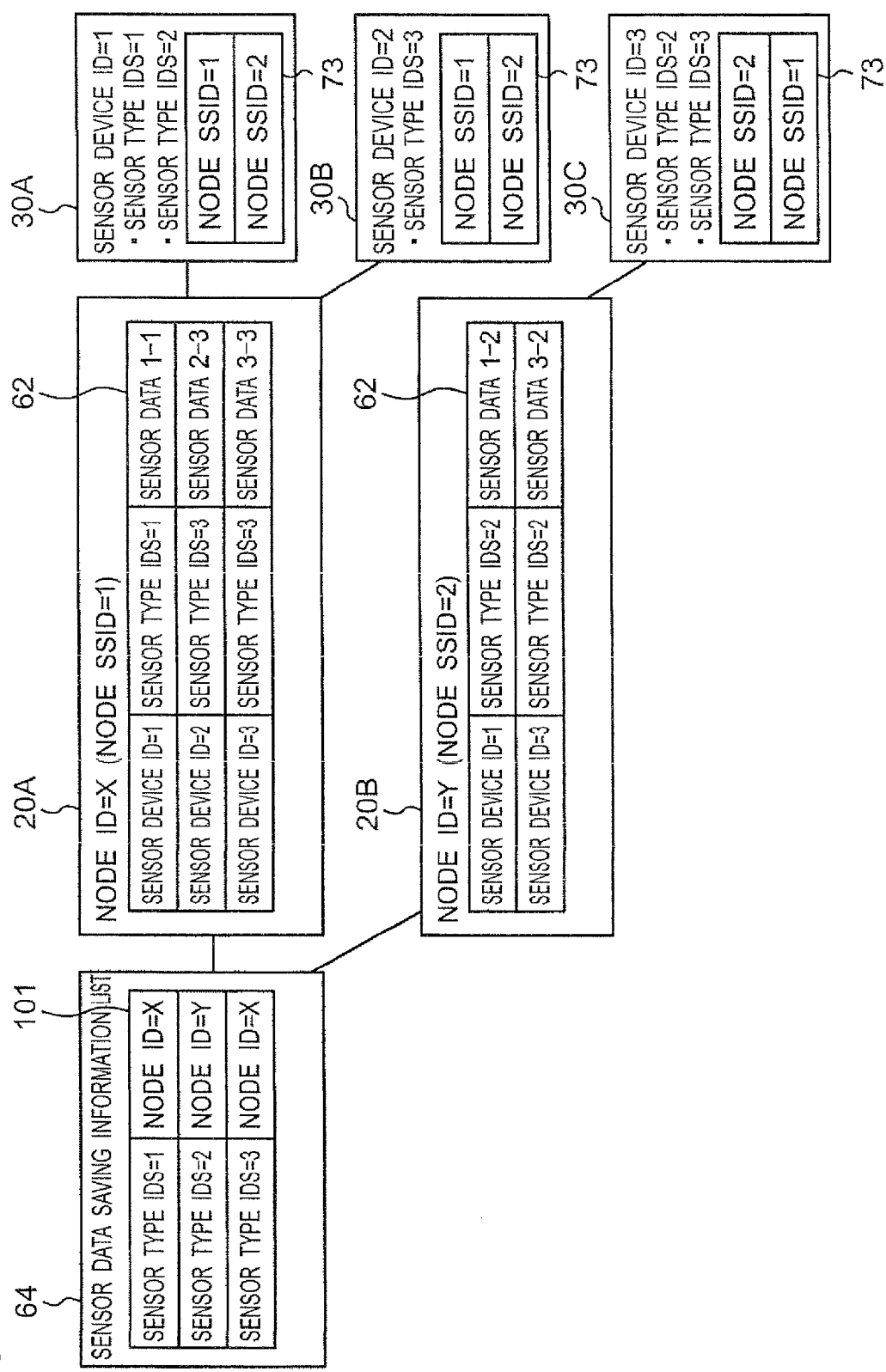
FIG. 8 is a diagram describing the sensor data having been transferred to the proper node devices for saving the sensor data based on information for identifying types of the sensor data according to one or more embodiments of the present invention.

As illustrated in FIGS. 7 and 8, it is assumed that the ID of the node device 20A is X (NODE ID=X) and the ID of the node device 20B is Y (NODE ID=Y). It is also assumed that the service set identifier (SSID) of the node device 20A is 1 (NODE SSID=1) and the SSID of the node device 20B is 2 (NODE SSID=2). The sensor data saving information list storage sections 64 of the node devices 20A and 20B save the sensor data saving information list 101 previously initialized by the user.

Here it is assumed that the ID of the sensor device 30A is 1 (sensor device ID=1), the ID of the sensor device 30B is 2 (sensor device ID=2), and the ID of the sensor device 30C is 3 (sensor device ID=3). It is also assumed that a sensor type ID of the temperature sensor 41 is 1 (IDS=1), the sensor type ID of the illuminance sensor 42 is 2 (IDS=2), and the sensor type ID of the flow velocity sensor 43 is 3 (IDS=3). As is apparent from FIGS. 7 and 8, the sensor device 30A includes the temperature sensor 41 and the illuminance sensor 42. Also, the sensor device 30B includes the flow velocity sensor 43 and the sensor device 30C includes the illuminance sensor 42 and the flow velocity sensor 43.

In this example, the sensor devices 30A and 30B each store the connection candidate lists indicating "NODE SSID=1" and "NODE SSID=2" in the connection target list storage sections 73 prioritized in the order of "NODE SSID=1" and "NODE SSID=2". In that order, the sensor devices 30A and 30B have tried to connect to the node device 20A via the wireless LAN at first and, as a result, established the connections with the node device 20A. On the other hand, the sensor device 30C stores the connection list indicating "NODE SSID=1" and "NODE SSID=2" in the connection target list storage section 73 prioritized in the order of "NODE SSID=2" and "NODE SSID=1". In that order, the sensor device 30C has tried to connect to the node device 20B via the wireless LAN at first and, as a result, established the connection with the node device 20B.

In that connection state, the sensor devices 30A, 30B, and 30C take measurements to acquire the sensor data every fixed period and transmit the sensor data to the node devices 20A and 20B are connected to the respective sensor devices 30A, 30B, and 30C via the wireless LAN.

Then, the node devices 20A and 20B acquire the sensor data and save them in the respective sensor data storage sections 62 of the memories 22. Subsequently, the sensor data arrangement sections 51, 51 of the node devices 20A and 20B transfer each of the sensor data saved in the sensor data storage sections 62 of the node devices 20A and 20B to the proper node devices 20A and 20B for saving the sensor data based on the sensor data saving information list 101.

In the example illustrated in FIG. 7, the sensor data saving information list 101 indicates the proper node devices for saving the sensor data according to the sensor device IDs for identifying the sensor devices that acquired the sensor data as the attributes of the sensor data. Specifically, the sensor data saving information list 101 indicates that the sensor data acquired by the sensor device 30A corresponding to "sensor device ID=1" are to be saved in the node device 20A corresponding to "NODE ID=X". Also, the sensor data saving information list 101 indicates that the sensor data acquired by the sensor device 30B corresponding to "sensor device ID=2" is to be saved in the node device 20B corresponding to "NODE ID=Y" and the sensor data acquired by the sensor device 30C corresponding to "sensor device ID=3" are to be saved in the node device 20A corresponding to "NODE ID=X".

As a result, these sensor data are categorized according to the sensor device ID and saved in the respective sensor data storage sections 62 of the node devices 20A and 20B. Specifically, in the node device 20A, "sensor data 1-1" and "sensor data 1-2" acquired by the sensor device 30A corresponding to "sensor device ID=1", and "sensor data 3-2" and "sensor data 3-3" acquired by the sensor device 30C corresponding to "sensor device ID=3" are saved. On the other hand, in the node device 20B, "sensor data 2-3" acquired by the sensor device 30B corresponding to "sensor device ID=2" is saved. Here, as for the two numbers after "sensor data", the first number indicates the sensor device ID of the sensor device acquired the sensor data and the second number indicates the sensor type IDS of the sensor data (the same applies hereinafter).

On the other hand, in the example illustrated in FIG. 8, the sensor data saving information list 101 indicates the proper node device for saving the sensor data for each of the sensor types IDS for identifying the types of the sensor data as the attribute of the sensor data. Specifically, the sensor data saving information list 101 indicates that the sensor data acquired by the temperature sensor 41 corresponding to "sensor type IDS=1" is to be saved in the node device 20A corresponding to "NODE ID=X". Also, the sensor data saving information list 101 indicates that the sensor data acquired by the illuminance sensor 42 corresponding to "sensor type IDS=2" is to be saved in the node device 20B corresponding to "NODE ID=Y" and the sensor data acquired by the flow velocity sensor 43 corresponding to "sensor type IDS=3" is to be saved in the node device 20A corresponding to "NODE ID=X".

As a result, these sensor data are categorized according to the sensor type IDS and saved in the respective sensor data storage sections 62 of the node devices 20A and 20B. Specifically, in the node device 20A, "sensor data 1-1" acquired by the temperature sensor 41 corresponding to "sensor type IDS=1" and "sensor data 2-3" and "sensor data 3-3" acquired by the flow velocity sensor 43 corresponding to "sensor type IDS=3" are saved. On the other hand, in the node device 20B, "sensor data 1-2" and "sensor data 3-2" acquired by the illuminance sensor 42 corresponding to "sensor type IDS=2" are saved.

In that case, the sensor data from the sensor devices 30A, 30B, and 30C are saved in the proper node devices for saving the sensor data among the plurality of node devices 20A and 20B according to the attribute of the sensor data such as the sensor device ID or the sensor type IDS. Therefore, the network system can categorize and save and also easily manage the sensor data.

Now, the operation of saving the sensor data in the plurality of node devices so as to achieve redundancy will be described in detail with reference to FIGS. 9 and 10 corresponding to FIGS. 7 and 8, respectively (The reference symbols in FIGS. 5 and 6 will be used as required.).

Figure 9:
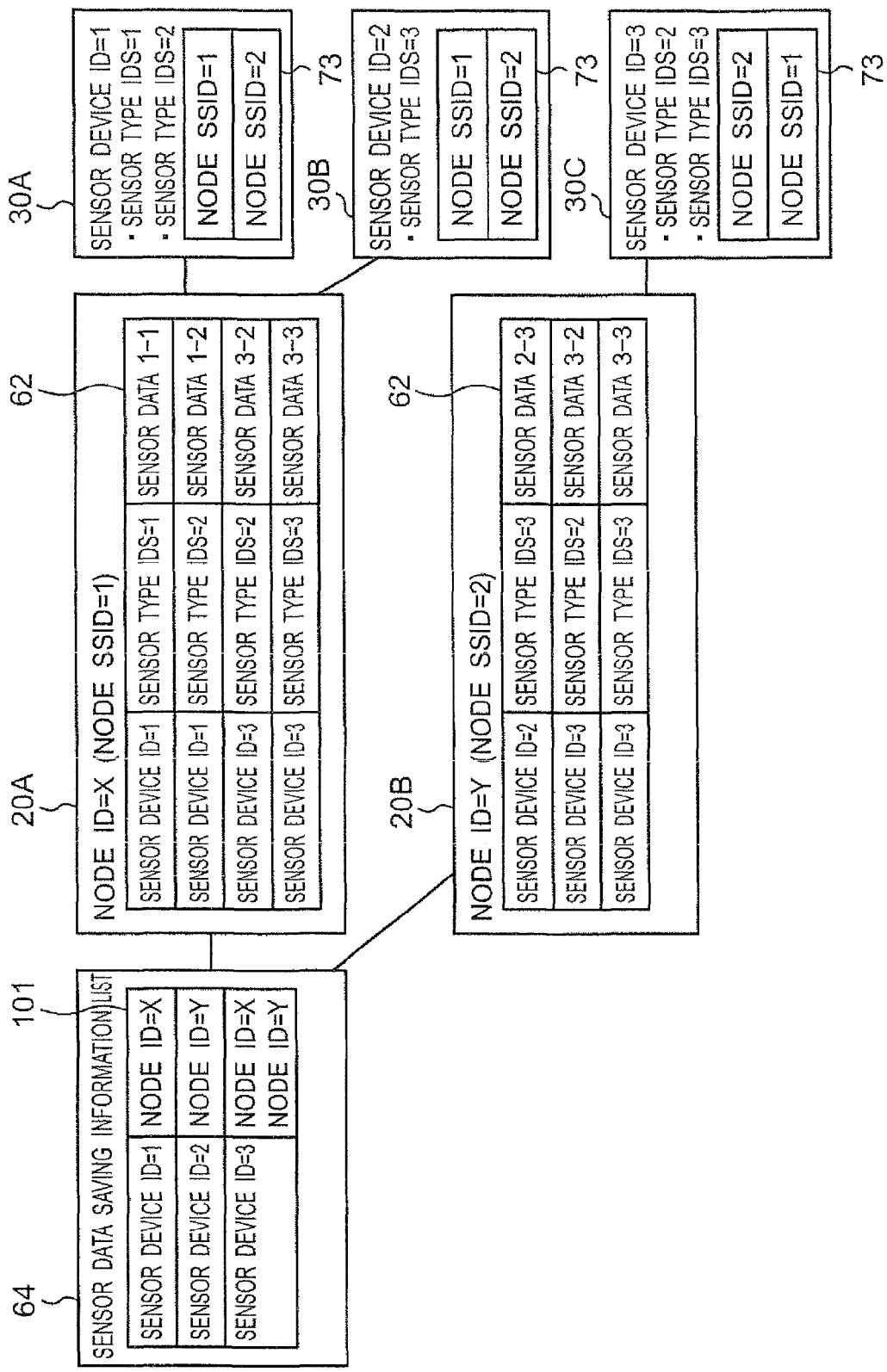
FIG. 9 is a diagram corresponding to FIG. 7 describing the sensor data which saved in the plurality of node devices to achieve redundancy according to one or more embodiments of the present invention.

As illustrated in FIG. 9, the sensor devices 30A, 30B, and 30C are connected to the node devices 20A and 20B in the same manner as illustrated in FIG. 7 (and FIG. 8). Here, the sensor data saving information list 101 indicates that the sensor data acquired by the sensor device 30C corresponding to "sensor device ID=3" are to be saved in the two node devices of the node device 20A corresponding to "NODE ID=X" and the node device 20B corresponding to "NODE ID=Y".

As a result, as for the sensor data from the sensor devices 30A, 30B, and 300, "sensor data 1-1", "sensor data 1-2", "sensor data 3-2", and "sensor data 3-3" are saved in the node device 20A similarly to those illustrated in FIG. 7. On the other hand, in the node device 20B, not only "sensor data 2-3" but also "sensor data 3-2" and "sensor data 3-3" acquired by the sensor device 30C corresponding to "sensor device ID=3" are saved. That is, both "sensor data 3-2" and "sensor data 3-3" are saved in the both sensor data storage sections 62 of the node devices 20A and 20B. Therefore, the network system can achieve redundancy of the sensor data.

Figure 10:
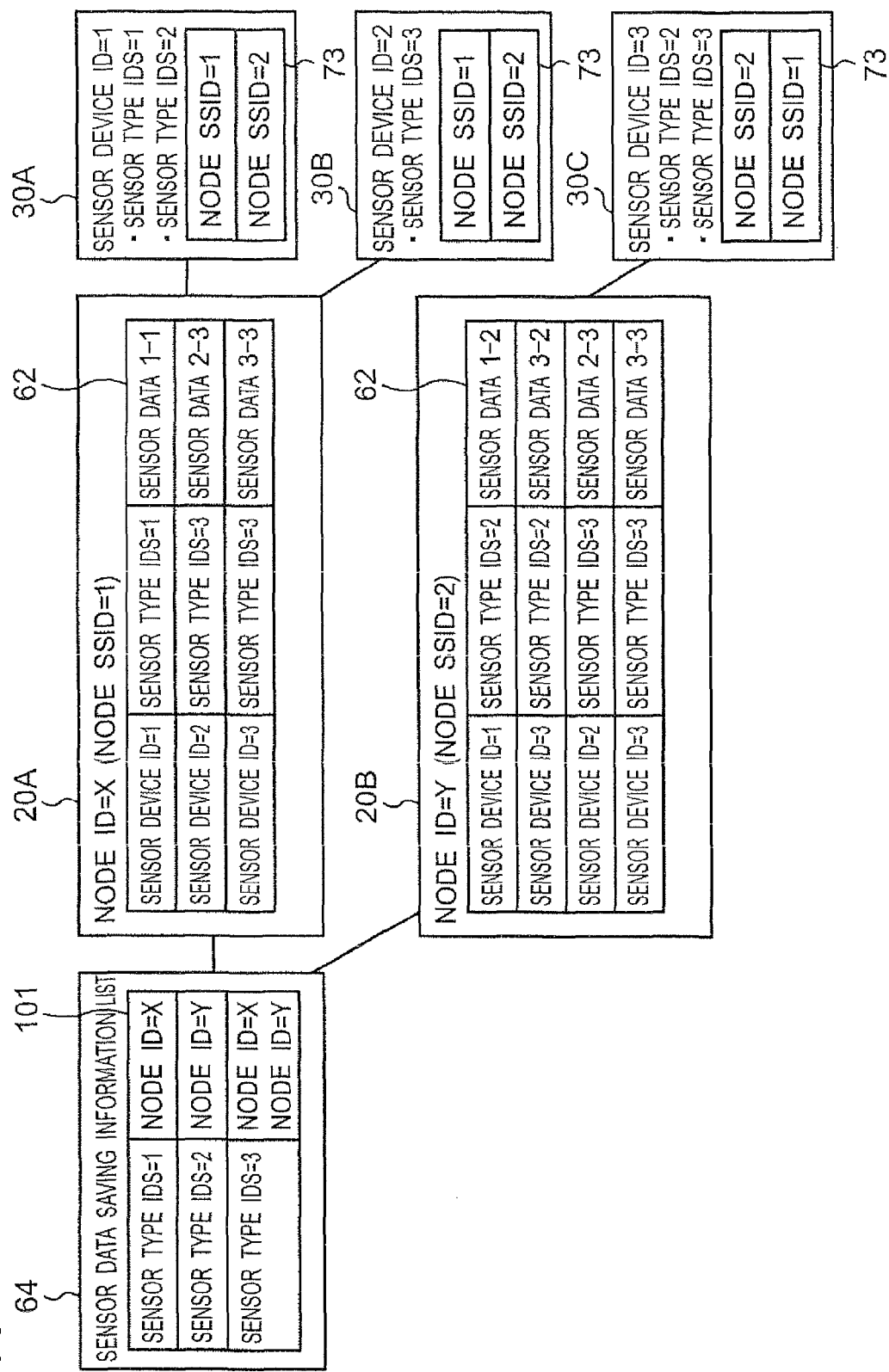
FIG. 10 is a diagram corresponding to FIG. 8 describing the sensor data which saved in the plurality of node devices to achieve redundancy according to one or more embodiments of the present invention.

On the other hand, as illustrated in FIG. 10, the sensor devices 30A, 30B, and 30C are connected to the node devices 20A and 20B in the same manner as illustrated in FIG. 7 (and FIG. 8). Here, the sensor data saving information list 101 indicates that the sensor data acquired by the flow velocity sensor 43 corresponding to "sensor type IDS=3" are to be saved in the two node devices of the node device 20A corresponding to "NODE ID=X" and the node device 20B corresponding to "NODE ID=Y".

As a result, as for the sensor data from the sensor devices 30A, 30B, and 30C, "sensor data 1-1", "sensor data 2-3", and "sensor data 3-3" are saved in the node device 20A similarly to those illustrated in FIG. 8. On the other hand, in the node device 20B, not only "sensor data 1-2" and "sensor data 3-2" as in FIG. 8 but also "sensor data 2-3" and "sensor data 3-3" acquired by the flow velocity sensor 43 corresponding to "sensor type IDS=3" are saved. That is, both "sensor data 2-3" and "sensor data 3-3" are saved in the both sensor data storage sections 62 of the node devices 20A and 20B. Therefore, the network system can achieve redundancy of the sensor data.

When the client PC 10 is to collect the sensor data, it requests the sensor data from any one or more of the one or more sensor devices 30A, 30B, 30C, . . . by specifying the sensor data and acquires the specified sensor data from the node devices which saved the specified sensor data in the sensor data storage sections 62 among the plurality of node devices 20A, 20B, 20C, . . . via the LAN 2. For example, the client PC 10 specifies sensor data from any one or more of the one or more sensor devices 30A, 30B, 30C, . . . and requests each of the plurality of node devices 20A, 20B, 20C, . . . for the sensor data via the LAN 2. In response to the request issued by the client PC 10, the node devices which saved the specified sensor data in the sensor data storage sections 62 among the plurality of node devices 20A, 20B, 20C, . . . transmit the specified sensor data to the client PC 10 via the LAN 2. As a result, the client PC 10 can acquire the desired sensor data even when it does not know which of the plurality of node devices 20A, 20B, 20C, . . . save the desired sensor data.

A wireless communication fault in the node device 20A or a change in the surroundings of the node device 20A, for example, may break the connections between the node device 20A and the sensor devices 30A and 30B connected to the node device 20A via the wireless communication. Even in the case of such disconnection, the network system 1 according to one or more embodiments of the present invention has the sensor devices 30A and 30B try to connect to the second target for connection "NODE SSID=2", i.e., the node device 20B and establishes a connection with the node device 20B according to the previously set connection target list stored in their connection target list storage sections 73. Once the node device 20B has established a new connection with the sensor devices 30A and 30B, the node device 20B can acquire the sensor data from the sensor devices 30A and 30B. The sensor data from the sensor devices 30A and 30B are saved in the proper node device 20A for saving the sensor data among the node devices 20A, 20B, 20C, . . . according to the attributes of the sensor data by the aforementioned sensor data arrangement section 51. Therefore, even after a wireless communication fault or the like in the node device 20A has broken the connection between the node device 20A and the sensor devices 30A and 30B, the client PC 10 can collect the sensor data from the sensor devices 30A and 30B reliably.

Figure 11:
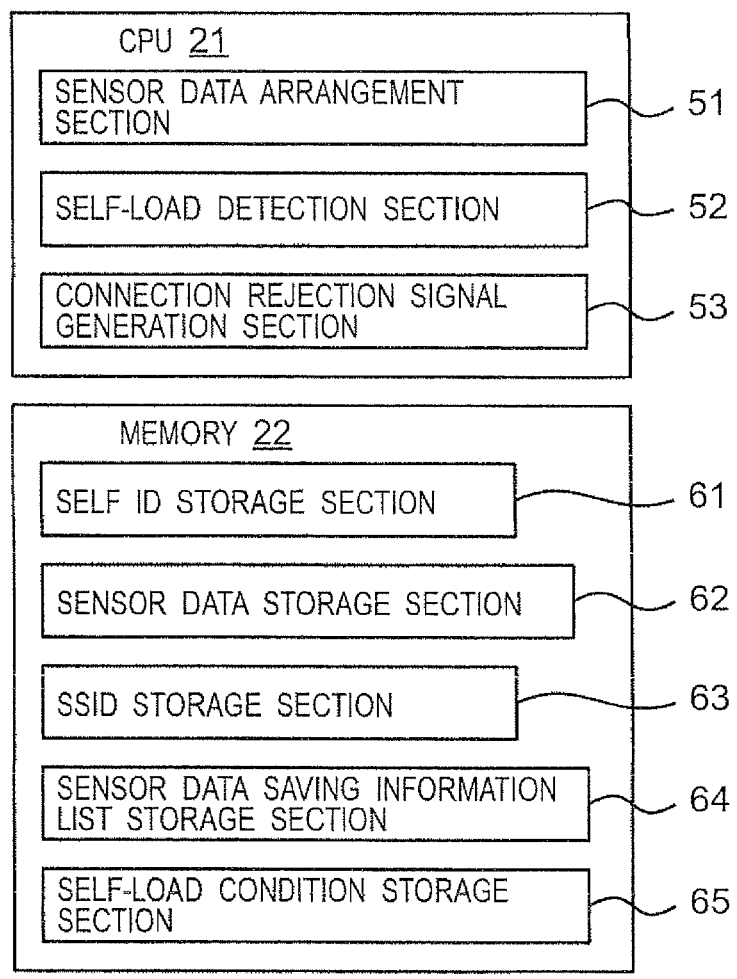
FIG. 11 is a diagram corresponding to FIG. 5 illustrating constituent elements of a modification of the node device from the viewpoint of functionality of the CPU (central processing unit) and the memory according to one or more embodiments of the present invention.
Figure 12:
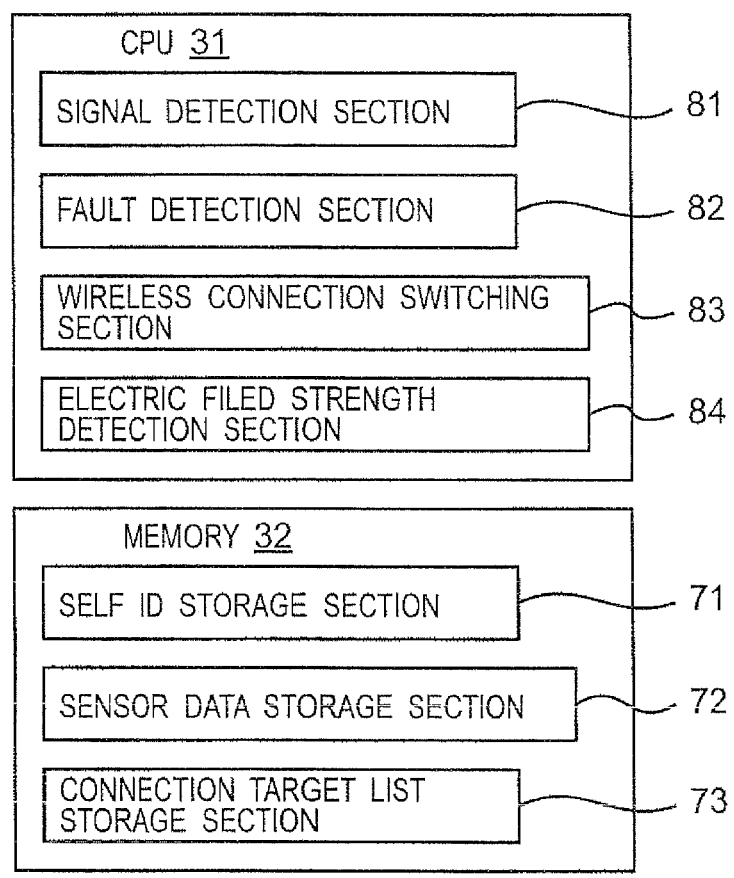
FIG. 12 is a diagram corresponding to FIG. 6 illustrating constituent elements of a modification of the sensor device from the viewpoint of functionality of the CPU (central processing unit) and the memory according to one or more embodiments of the present invention.

FIG. 11 illustrates constituent elements from the viewpoint of functionality of the CPU 21 and the memory 22 with respect to a modification of the node device 20 correspondingly to FIG. 5. FIG. 12 illustrates constituent elements from the viewpoint of functionality of the CPU 31 and the memory 32 with respect to a modification of the sensor device 30 correspondingly to FIG. 6. In FIGS. 11 and 12, the same constituent elements as those in FIGS. 5 and 6 are denoted by the same reference numbers as those in FIGS. 5 and 6 and their description will be omitted.

The CPU 21 of each of the node devices 20 illustrated in FIG. 11 has a self-load detection section 52 and a connection rejection signal generation section 53 in addition to the sensor data arrangement section 51 (The self-load detection section 52 and the connection rejection signal generation section 53 are implemented as software programs.). The memory 22 of each of the node devices 20 has a self-load condition storage section 65.

Every certain period, the self-load detection section 52 in each of the node devices 20 detects the load on the node device 20 includes the self-load detection section 52. In this example, the self-load detection section 52 detects mean values C11, C12, . . . of the utilization rate of the CPU 21 included in the node device 20 of the self-load detection section 52 for respective time slots □t1, □t2, . . . of five minutes each as the certain period as the load on the node device 20 of the self-load detection section 52 (The utilization rate of the CPU 21 may range from 0% to 100% inclusive according to the operation situation.). When the load on the node device 20 (in this example, the mean value of the CPU utilization rate) is greater than a threshold value previously set by the user (in this example, 70%), the connection rejection signal generation section 53 of each of the node devices 20 generates the connection rejection signal for rejecting a connection between the node device 20 itself and the sensor device 30. The self-load condition storage section 65 of each of the node devices 20 stores the detected load on the node device 20 itself.

The CPU 31 of each of the sensor devices 30 illustrated in FIG. 12 has a signal detection section 81, a fault detection section 82, a wireless connection switching section 83, and an electric field strength detection section 84 (The signal detection section 81, the fault detection section 82, the wireless connection switching section 83, and the electric field strength detection section 84 are implemented as software programs.).

The signal detection section 81 of each of the sensor devices 30 detects the connection rejection signal from the node device 20 connected to the sensor device 30 via the wireless communication. The fault detection section 82 of each of the sensor devices 30 detects a wireless communication fault in the node device 20 connected to the sensor device 30 via the wireless communication. When the signal detection section 81 detected the connection rejection signal or the fault detection section 82 detected the wireless communication fault, the wireless connection switching section 83 of each of the sensor devices 30 stops connecting to the node device currently connected to the sensor device 30 and sequentially trying to connect to the candidate node devices for connection other than the node device currently connected to the sensor device 30 itself. The electric field strength detection section 84 of each of the sensor devices 30 detects the node devices 20 available for the sensor device 30 to connect to via the wireless communication and the electric field strengths of the node devices 20.

Now, processes in which the sensor device 30B responds to detection of the connection rejection signal transmitted from the node device 20A connected to the sensor device 30B via the wireless communication by operating the signal detection section 81 and the wireless connection switching section 83 to cause the sensor device 30B to be connected to the node device 20B so that the sensor data in the sensor device 30B is saved in the node devices 20A and 20B will be described with reference to FIG. 13 (The reference symbols in FIGS. 11 and 12 will be used as required.).

Figure 13:
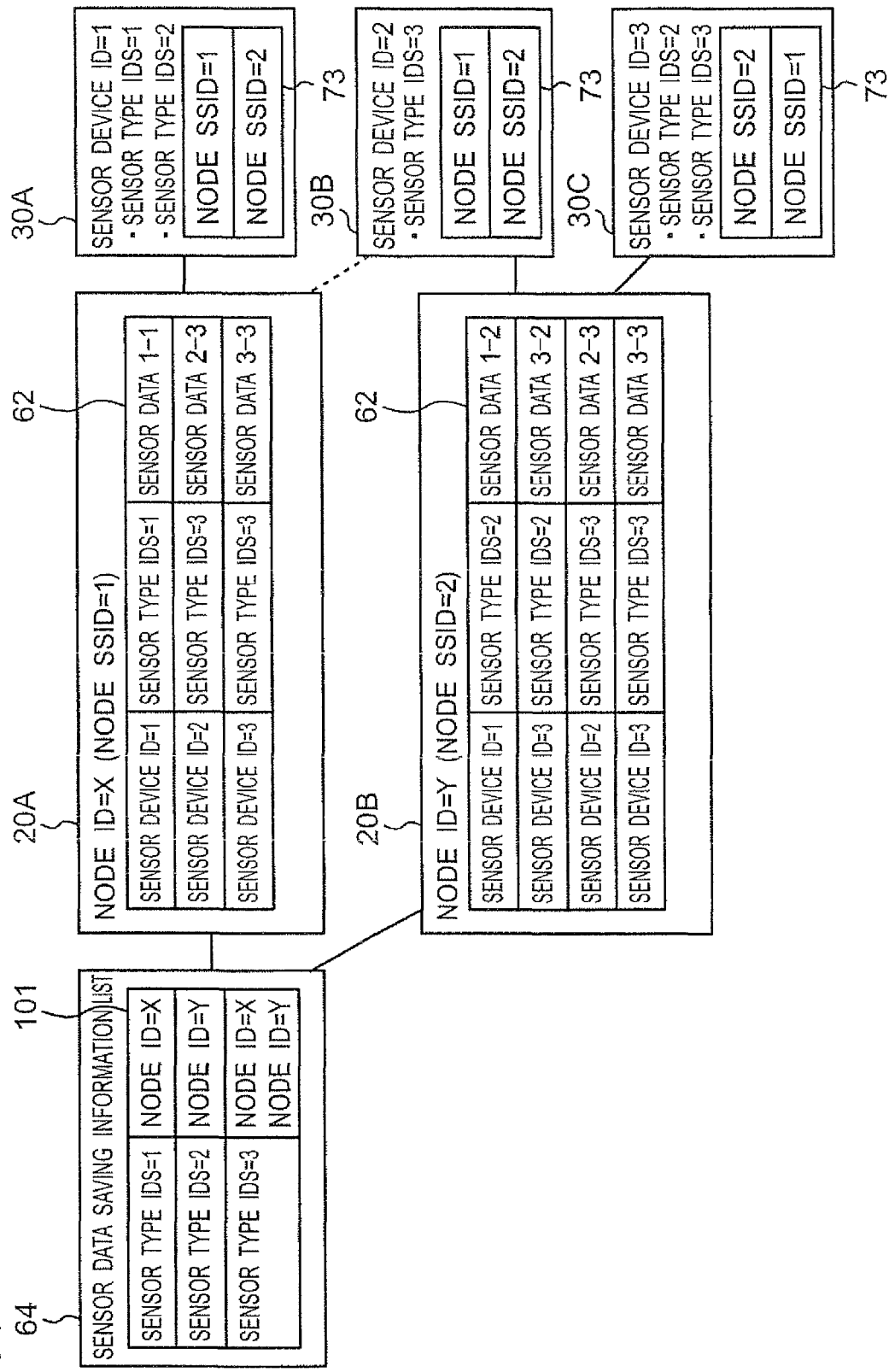
FIG. 13 is a diagram describing a process of changing a connection state between the node devices and the sensor devices when one of the sensor devices detected a connection rejection signal from one of the node devices or one of the node devices has a wireless communication fault according to one or more embodiments of the present invention.

As illustrated in FIG. 13, when the sensor devices 30A, 30B, and 30C are connected to the node devices 20A and 20B via the wireless communication, the node device 20A transmits the connection rejection signal to the sensor device 30B. In response to detection of the connection rejection signal by the signal detection section 81 of the sensor device 30B, the wireless connection switching section 83 of the sensor device 30B tries to connect to the second target for connection "NODE SSID=2", i.e., the node device 20B to switch from the node device 20A to the node device 20B and establishes a connection with the node device 20B according to the previously set connection target list stored in the connection target list storage section 73. Then, the node device 20B is able to acquire "sensor data 2-3" acquired by the sensor device 30B and the sensor data arrangement section 51 of the node device 20B transfers "sensor data 2-3" to the node device 20A based on the sensor data saving information list 101. As a result, even when the connection rejection signal detected, the node device 20B connected to the sensor device 30B by the wireless connection switching section 83 as a successor to the node device 20A previously connected to the sensor device 30B can automatically acquire "sensor data 2-3" from the sensor device 30B. Therefore, the successor node device 20B connected to the sensor device 30B can acquire "sensor data 2-3" from the sensor device 30B. Further, the embodiment can prevent overload of each of the node devices 20 caused by the load on each of the node devices 20 exceeding the threshold value. Consequently, the embodiment can improve the performance of the whole of the network system 1. For example, the embodiment can avoid a situation in which any of the node devices 20A, 20B, 20C, . . . has a trouble in responding to the client PC 10 with the sensor data. Further, the network system can always keep good performance even when the condition of the radio wave for the wireless communication, the network traffic, and the number of sensor data collected by each sensor device change every moment.

Now, processes in which the sensor device 30B responds to detection of a wireless communication fault in the node device 20A connected to the sensor device 30B via the wireless communication by operating the fault detection section 82 and the wireless connection switching section 83 to cause the sensor device 30B to be connected to the node device 20B via the wireless communication so that the sensor data in the sensor device 30B is saved in the node devices 20A and 20B will be described also with reference to FIG. 13 (The reference symbols in FIGS. 11 and 12 will be used as required.

As illustrated in FIG. 13, when the sensor devices 30A, 30B, and 30C are connected to the node devices 20A and 20B via the wireless communication, the fault detection section 82 of the sensor device 30B detects a wireless communication fault in the node device 20A. In response, the wireless connection switching section 83 of the sensor device 30B tries to connect to the second target for connection "NODE SSID=2", i.e., the node device 20B to switch from the node device 20A to the node device 20B and establishes a connection with the node device 20B according to the previously set connection target list stored in the connection target list storage section 73. Then, the node device 20B is able to acquire "sensor data 2-3" acquired by the sensor device 30B and the sensor data arrangement section 51 of the node device 20B transfers "sensor data 2-3" to the node device 20A based on the sensor data saving information list 101. As a result, even when the wireless communication fault detected, the node device 20B connected to the sensor device 30B by the wireless connection switching section 83 as a successor to the node device 20A previously connected to the sensor device 30B can automatically acquire the sensor data from the sensor device 30B. Therefore, the embodiment can realize fault-tolerance (being tolerant to a fault, i.e., capability of minimizing damage caused by a wireless communication fault).

Figure 14:
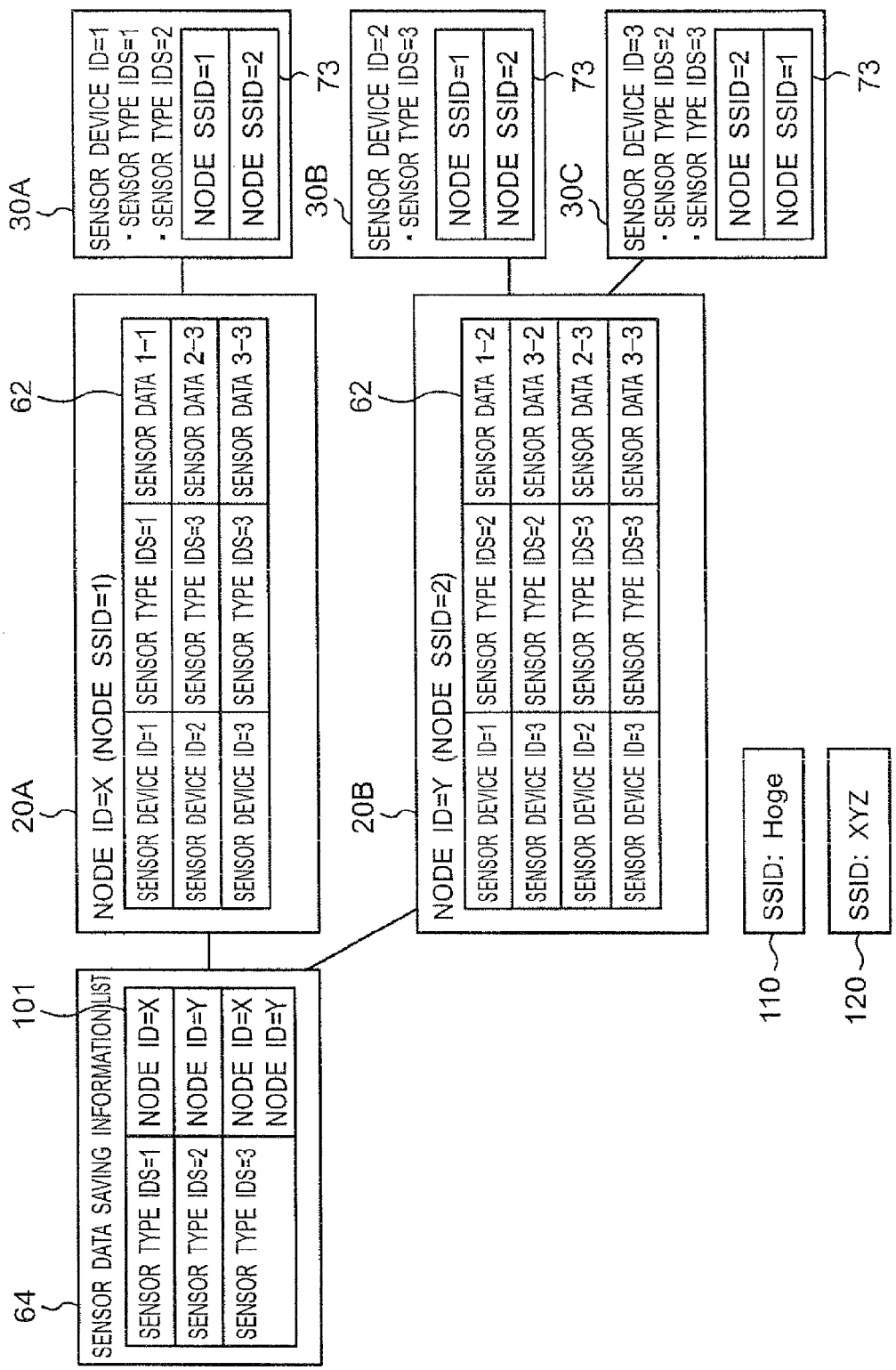
FIG. 14 is a diagram describing a process of connecting a new sensor provided with an electric field strength detection section to the node device via the wireless communication according to one or more embodiments of the present invention.

Now, processes in which the electric field strength detection section 84 is operated so that a new sensor device 30C is connected to the node device 20B via the wireless communication in installment of the new sensor device 30C in the network system 1 will be described with reference to FIGS. 14 and 15 (The reference symbols in FIGS. 11 and 12 will be used as required.).

First, the electric field strength detection section 84 of the new sensor device 30C detects the node devices 20 available for the sensor device 30C to connect to via the wireless communication and the electric field strengths of the node devices 20 when installed to the network system 1. As illustrated in FIG. 14, it is assumed that devices 110 and 120 different from the node devices 20 in the vicinity of the sensor device 30C have SSIDs of "Hoge" and "XYZ", respectively. In this case, the electric field strength detection section 84 first creates a connection target list that indicates SSIDs and the electric field strengths of the different devices 110 and 120 in addition to those of the node devices 20A and 20B as illustrated in FIG. 15A. Next, based on the created list, the electric field strength detection section 84 creates a connection target list for the sensor device 30C indicating the node devices fit the conditions previously set by the user (in this example, "the node devices have SSIDs starting with "NODE"" and "in the descending order of the electric field strengths"). Specifically, as illustrated in FIG. 15B, the electric field strength detection section 84 creates a connection target list for the sensor device 30B indicating NODE SSID=2 (the node device 20B) with the electric field strength of −60 dbm and NODE SSID=1 (the node device 20A) with the electric field strength of −70 dbm in order.

Next, the electric field strength detection section 84 causes the contents of the connection target list to be reflected in the connection target list storage sections 73 of the sensor device 30C. As a result, based on the contents of the connection target list, the sensor device 30C sequentially tries to connect to the node devices in descending order of the electric field strength. Specifically, first, the sensor device 30C tries to connect to the node device 20B corresponding to "NODE SSID=2" and establishes a connection with the node device 20B. Therefore, the sensor device 30C can sequentially try to connect to the node devices available for the sensor device 30C to connect to in descending order of the electric field strength and establish a connection with the node device. As a result, the node device 20B can acquire the sensor data from the sensor device 30C reliably. Further, the sensor device 30C can promptly connect to an appropriate one of the node devices based on the connection target list instead of recklessly repeating retry of transmission to the node device.

In addition, in the case the connection target list is previously set by the user, the sensor device 30C can more promptly connect to an appropriate one of the node devices based on the connection target list.

Although the network system 1 includes one client PC 10 as a computer apparatus in the above described embodiments, the network system 1 is not limited to that. The network system 1 may include a plurality of client devices or various types of computers be able to communicate via a network such as a server device and a host computer.

Although it is assumed that one client PC 10 as a computer apparatus and the node devices 20A, 20B, 20C, . . . are connected by the LAN 2 as a network in the above described embodiments, the network is not limited to that. The network connecting the computer apparatus and the node device may be a computer network such as a wide area network (WAN) or the Internet and it may be wired or wireless.

Although each of the node devices 20A, 20B, and 20C has SSID for identifying the wireless LAN in the above described embodiments, the identifier is not limited to that. Any identifier may be used as far as it can identify the wireless LAN from LANs of the other networks.

Although the sensor data saving information list 101 indicates a proper node device among the node devices 20A, 20B, 20C, . . . for saving each of the sensor data according to the information for identifying the sensor device that acquired the sensor data or the information for identifying the type of the sensor data in the above described embodiments, the sensor data saving information list 101 is not limited to that. The sensor data saving information list 101 may indicate a proper node device for saving each of the sensor data according to other attributes of the sensor data.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF REFERENCE NUMERALS

1: Network system
2: LAN
10: Client PC
20, 20A, 20B, 20C: Node device
30, 30A, 30B, 30C, 30D, 30E, 30F, 30G: Sensor device
101: Sensor data saving information list

The invention claimed is:

1. A network system comprising:
at least one computer apparatus and
a plurality of node devices are communicatively connected to each other via a network,
wherein each of the plurality of node devices is accessible by one or more sensor devices via the wireless communication,
wherein each of the sensor devices sequentially tries to connect to one or more candidate node devices for connection among the plurality of node devices via the wireless communication,
wherein each of the node devices acquires a sensor data from the sensor device connected to the node device itself via the wireless communication and saves the sensor data in a sensor data storage section included in the node device itself,
wherein the computer apparatus requests the sensor data from any one or more of the one or more sensor devices by specifying the sensor data and acquires the sensor data from any of the plurality of node devices via the network, and
wherein the network system comprises:
  a sensor data saving information list storage section for storing a sensor data saving information list indicates a proper node device among the plurality of node devices for saving each of the sensor data saved in the sensor data storage sections of the plurality of node devices according to an attribute of the sensor data; and
  a sensor data arrangement section for transferring each of the sensor data saved in the sensor data storage sections of the plurality of node devices to the proper node device for saving the sensor data based on the sensor data saving information list.

2. The network system according to claim 1, wherein the attribute of the sensor data is information for identifying the sensor device that acquired the sensor data.

3. The network system according to claim 1, wherein the attribute of the sensor data is information for identifying a type of the sensor data.

4. The network system according to claim 1, wherein the sensor data saving information list indicates that the sensor data of the same contents are to be saved in at least two of the plurality of node devices respectively.

5. The network system according to claim 1, wherein each of the node devices generates a connection rejection signal for rejecting a connection between the node device itself and the sensor device, when a load on the node device itself is greater than a threshold value, and each of the sensor devices comprises:
- a signal detection section for detecting the connection rejection signal generated by the node device itself from the node device connected to the sensor device itself via the wireless communication; and
- a first wireless connection switching section for stopping connecting to the node device currently connected to the sensor device itself and sequentially trying to connect to the candidate node device for connection other than the node device currently connected to the sensor device itself, when the signal detection section detected the connection rejection signal.

6. The network system according to claim 1, wherein each of the sensor devices comprises:
- a fault detection section for detecting a fault in the node device connected to the sensor device itself via the wireless communication; and
- a second wireless connection switching section for stopping connecting to the node device currently connected to the sensor device itself and sequentially trying to connect to the candidate node device for connection other than the node device currently connected to the sensor device itself, when the fault detection section detected the fault.

7. The network system according to claim 1,
wherein each of the sensor devices comprises an electric field strength detection section for detecting a node device available for the sensor device itself to connect to via the wireless communication and detecting an electric field strength of the node device, and
wherein each of the sensor devices sequentially tries to connect to the node devices in descending order of the electric field strength.

8. The network system according to claim 1,
wherein each of the sensor devices comprises a connection target list storage section for storing a connection target list that indicates the candidate node devices for connection, and
wherein each of the sensor devices sequentially tries to connect to one or more of the candidate node devices indicated in the connection target list.

9. The network system according to claim 8, wherein the connection target list is a predetermined list.

10. The network system according to claim 1,
wherein the sensor data saving information list storage section is provided for each of the plurality of node devices respectively and
wherein contents of the sensor data saving information lists in the plurality of node devices are synchronized with each other.

11. A node device group comprising a plurality of node devices in a network system,
wherein at least one computer apparatus and the plurality of node devices are communicatively connected to each other via a network,
wherein each of the plurality of node devices is accessible by one or more sensor devices via the wireless communication,
wherein each of the sensor devices sequentially tries to connect to one or more candidate node devices for connection among the plurality of node devices via the wireless communication,
wherein each of the node devices acquires a sensor data from the sensor device connected to the node device itself via the wireless communication and saves the sensor data in a sensor data storage section included in the node device itself,
wherein the computer apparatus requests the sensor data from any one or more of the one or more sensor devices by specifying the sensor data and acquires the sensor data from any of the plurality of node devices via the network, and
wherein the node device group comprises:
- a sensor data saving information list storage section for storing a sensor data saving information list indicates a proper node device among the plurality of node devices for saving each of the sensor data saved in the sensor data storage sections of the plurality of node devices according to an attribute of the sensor data; and
- a sensor data arrangement section for transferring each of the sensor data saved in the sensor data storage sections of the plurality of node devices to the proper node device for saving the sensor data based on the sensor data saving information list.

12. A sensor device group comprising one or more sensor devices in a network system,
wherein at least one computer apparatus and a plurality of node devices are communicatively connected to each other via a network,
wherein each of the plurality of node devices is accessible by one or more of the sensor devices via the wireless communication,
wherein each of the node devices acquires a sensor data from the sensor device connected to the node device itself via the wireless communication and saves the sensor data in a sensor data storage section included in the node device itself,
wherein the computer apparatus requests the sensor data from any one or more of the one or more sensor devices by specifying the sensor data and acquires the sensor data from any of the plurality of node devices via the network, and
wherein the network system comprises:
- a sensor data saving information list storage section for storing a sensor data saving information list indicates a proper node device among the plurality of node devices for saving each of the sensor data saved in the sensor data storage sections of the plurality of node devices according to an attribute of the sensor data; and
- a sensor data arrangement section for transferring each of the sensor data saved in the sensor data storage sections of the plurality of node devices to the proper node device for saving the sensor data based on the sensor data saving information list, and each of the sensor devices sequentially tries to connect to one or more candidate node devices for connection among the plurality of node devices via the wireless communication.

13. The sensor device group according to claim 12,
wherein each of the node devices generates a connection rejection signal for rejecting a connection between the node device itself and the sensor device, when a load on the node device itself is greater than a threshold value, and
wherein each of the sensor devices comprises:
- a signal detection section for detecting the connection rejection signal generated by the node device itself from the node device connected to the sensor device itself via the wireless communication; and a first wireless connection switching section for stopping connecting to the node device currently connected to the sensor device itself and sequentially trying to connect to the candidate node device for connection other than the node device currently connected to the sensor device itself, when the signal detection section detected the connection rejection signal.

14. The sensor device group according to claim 12, wherein each of the sensor devices comprises:
   a fault detection section for detecting a fault in the node device connected to the sensor device itself via the wireless communication; and
   a second wireless connection switching section for stopping connecting to the node device currently connected to the sensor device itself and sequentially trying to connect to the candidate node device for connection other than the node device currently connected to the sensor device itself, when the fault detection section detected the fault.

15. The sensor device group according to claim 12,
   wherein each of the sensor devices comprises an electric field strength detection section for detecting a node device available for the sensor device itself to connect to via the wireless communication and detecting an electric field strength of the node device, and
   wherein each of the sensor devices sequentially tries to connect to the node devices in descending order of the electric field strength.

16. The sensor device group according to claim 12,
   wherein each of the sensor devices comprises a connection target list storage section for storing a connection target list that indicates the candidate node devices for connection, and
   wherein each of the sensor devices sequentially tries to connect to one or more of the candidate node devices indicated in the connection target list.

17. The sensor device group according to claim 13, wherein each of the sensor devices comprises:
   a fault detection section for detecting a fault in the node device connected to the sensor device itself via the wireless communication; and
   a second wireless connection switching section for stopping connecting to the node device currently connected to the sensor device itself and sequentially trying to connect to the candidate node device for connection other than the node device currently connected to the sensor device itself, when the fault detection section detected the fault.

18. A method for transmitting and receiving sensor data in a network system comprising at least one computer apparatus and a plurality of node devices are communicatively connected to each other via a network, each of the plurality of node devices is accessible by one or more sensor devices via the wireless communication, each of the sensor devices sequentially tries to connect to one or more candidate node devices for connection among the plurality of node devices via the wireless communication, each of the node devices acquires a sensor data from the sensor device connected to the node device itself via the wireless communication and saves the sensor data in a sensor data storage section included in the node device itself, and the computer apparatus requests the sensor data from any one or more of the one or more sensor devices by specifying the sensor data and acquires the sensor data from any of the plurality of node devices via the network, the method comprising:
   causing a sensor data saving information list storage section to store a sensor data saving information list indicates a proper node device among the plurality of node devices for saving each of the sensor data saved in the sensor data storage sections of the plurality of node devices according to an attribute of the sensor data; and
   causing a sensor data arrangement section to transfer each of the sensor data saved in the sensor data storage sections of the plurality of node devices to the proper node device for saving the sensor data based on the sensor data saving information list.

\* \* \* \* \*